United States Patent
Gupta et al.

(10) Patent No.: US 10,853,111 B1
(45) Date of Patent: Dec. 1, 2020

(54) VIRTUAL MACHINE INSTANCE MIGRATION FEEDBACK

(71) Applicant: Amazon Technologies, Inc., Seattle, WA (US)

(72) Inventors: Diwakar Gupta, Seattle, WA (US); Georgios Elissaios, Seattle, WA (US); Weili Zhong McClenahan, Seattle, WA (US); Alan Hadley Goodman, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 82 days.

(21) Appl. No.: 14/870,695

(22) Filed: Sep. 30, 2015

(51) Int. Cl.
  *G06F 9/455* (2018.01)
  *G06F 8/65* (2018.01)

(52) U.S. Cl.
  CPC ............ *G06F 9/45533* (2013.01); *G06F 8/65* (2013.01)

(58) Field of Classification Search
  CPC .............................. G06F 9/45533; G06F 8/65
  See application file for complete search history.

(56) References Cited

U.S. PATENT DOCUMENTS

| | | | | |
|---|---|---|---|---|
| 8,175,863 B1 * | 5/2012 | Ostermeyer | ........ | G06F 17/5009 703/13 |
| 8,615,579 B1 * | 12/2013 | Vincent | ................ | G06F 9/4856 709/224 |
| 2013/0014103 A1 * | 1/2013 | Reuther | ................ | G06F 3/0647 718/1 |
| 2013/0155073 A1 * | 6/2013 | Khodorkovsky | ......... | G06F 3/14 345/501 |
| 2014/0298338 A1 * | 10/2014 | Doi | ....................... | G06F 9/4856 718/1 |
| 2015/0019488 A1 * | 1/2015 | Higginson | ............ | G06F 17/303 707/634 |
| 2015/0032894 A1 * | 1/2015 | Rosensweig | ........ | H04L 41/5019 709/226 |
| 2015/0172130 A1 * | 6/2015 | Colla | .................. | G06F 9/45533 709/223 |
| 2016/0142261 A1 * | 5/2016 | Huang | .................. | G06F 3/0647 709/223 |
| 2016/0337480 A1 * | 11/2016 | Anerousis | ........... | G06F 9/45558 |

OTHER PUBLICATIONS

Akoush et al. Predicting the Performance of Virtual Machine Migration. [online] IEEE., pp. 37-46. Retrieved From the Internet <https://ieeexplore.ieee.org/stamp/stamp.jsp?arnumber=5581607&tag=1> (Year: 2010).*

* cited by examiner

*Primary Examiner* — Emerson C Puente
*Assistant Examiner* — Jonathan R Labud
(74) *Attorney, Agent, or Firm* — Davis Wright Tremaine LLP

(57) ABSTRACT

Techniques for providing customer feedback related to virtual machine instance maintenance events are described herein. A customer is provided with an event message specifying a virtual machine maintenance operation and a proposed time to perform that virtual machine maintenance operation. A response that specifies the time that the customer wishes to perform the virtual machine maintenance operation is received and the virtual machine maintenance operation is scheduled based at least in part on that specified time.

21 Claims, 12 Drawing Sheets

VIRTUAL MACHINE INSTANCE MIGRATION FEEDBACK

BACKGROUND

Maintenance of virtual computer systems may require coordinating the maintenance operations. For example, when the resources of a particular host computer system become scarce due to, for example, overutilization by client virtual computer systems, it may become desirable to migrate a virtual computer system to a different host computer system to avoid reduced system performance, system outages or failures, and a degraded user experience.

One approach to the problem of maintaining a virtual computer system is to halt the virtual computer system, copy the memory and/or the system state of the virtual computer system to the different host computer system, perform any updates to the virtual computer system, and then restart the virtual computer system. However, in the case of a large or complicated virtual computer system, this maintenance process can take a significant amount of time, and the ability of a user to interact with the virtual computer system during that time period may be eliminated or at least severely restricted. Additionally, some system resources, such as attached storage and network connections may be volatile, introducing the possibility that the migrated virtual computer system may differ significantly from the original virtual computer system, further introducing operational issues.

BRIEF DESCRIPTION OF THE DRAWINGS

Various techniques will be described with reference to the drawings, in which.

DETAILED DESCRIPTION

Figure 1:
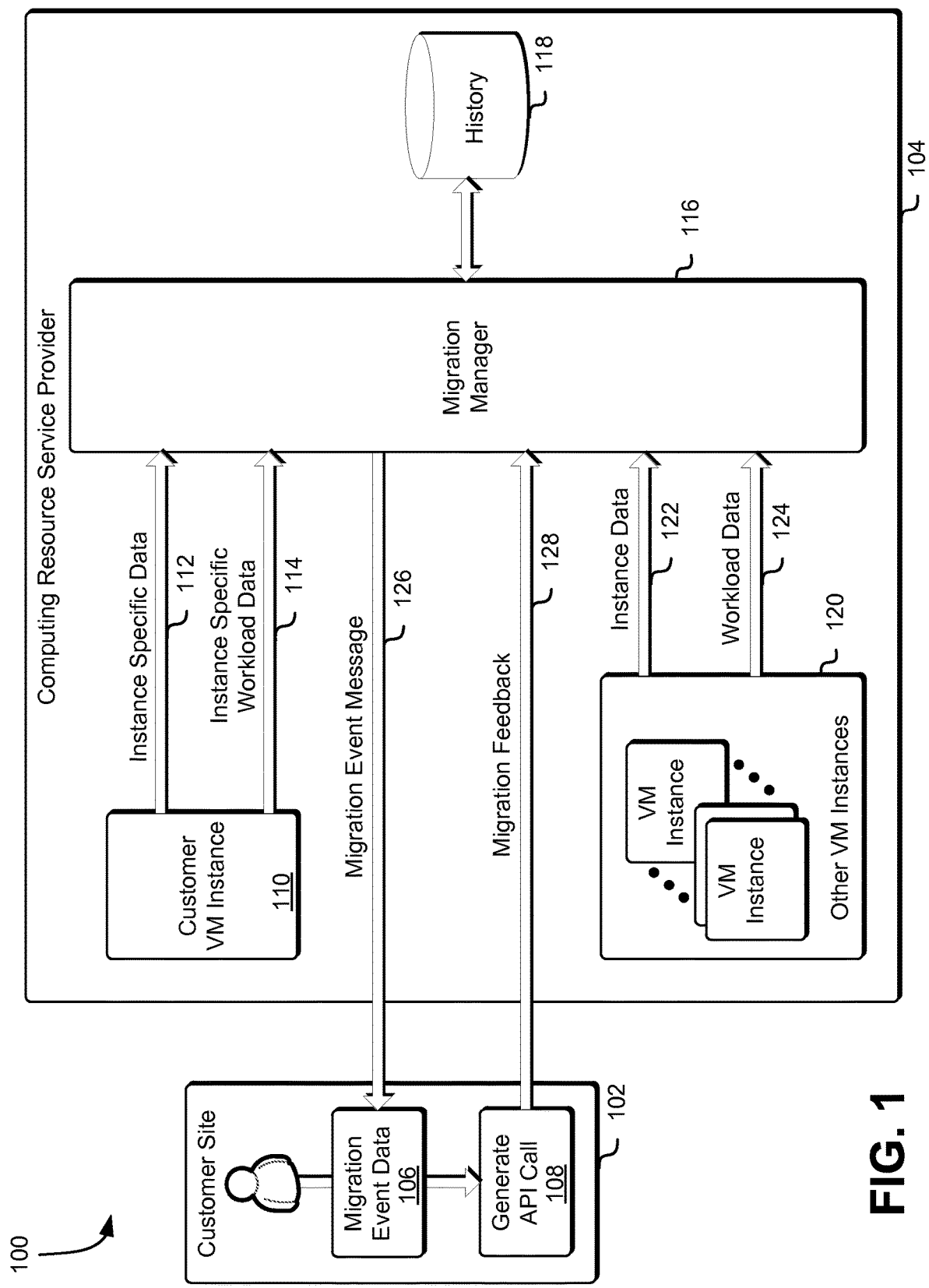
FIG. 1 illustrates an example environment where feedback for virtual machine instance migration may be received.

This disclosure relates to obtaining feedback associated with maintenance operations for virtual machine instances. A computing resource service provider may obtain feedback associated with maintenance operations that may be performed on virtual machine instances, which are hosted on computer systems provided by the computing system resource provider. The feedback may be obtained from a customer of the computing resource service provider using an application programming interface so that the customer may impact how those virtual machine instances are managed and maintained by the computing resource service provider.

In one example, a service operating within a computing resource service provider environment may determine that a virtual machine ("VM") instance may be migrated from a first host computer system to a second host computer system. The service may make this determination based at least in part on the workload of the VM instance, the size of the VM instance, resources associated with the VM instance, or on a combination of these and/or other factors. The service may also make this determination based at least in part on a confidence measure indicating a likelihood of success of such a migration and whether such migration may be completed such that the VM instance will be unavailable (i.e., paused during the migration) for a sufficiently short time period so as not to disrupt a user experience.

The migration may be a live migration where the original VM instance remains available for as long as possible so as not to disrupt a user's interaction with the VM instance. During a live migration, a new VM instance is instantiated in a new location and, after the new VM instance is prepared, a critical phase of the migration starts where the original VM instance is paused, any remaining differences between the original VM instance and the new VM instance are resolved, and the new VM instance is started. The length and impact of the critical migration phase can be minimized by performing a majority of the migration before locking the VM and thus minimizing the amount of time that the VM is unavailable.

In the examples described herein, the service may determine that a live migration may cause the VM instance to be unavailable for use (e.g., during the critical phase) for a predicted or determined time period. This time period may be determined from past live migrations of the same VM instance, or may be determined from past live migrations of other similar VM instances provided by the computing resource service provider, or may be determined experimentally by, for example, loading an example VM instance with running applications that simulate resource loading and performing live migrations under various conditions.

If the service determines that the time that the VM instance will be unavailable is sufficiently short, the service may tentatively schedule the live migration and may send a maintenance event to the customer that owns the VM instance. The maintenance event message (also referred to herein as a "virtual machine instance maintenance event message") may specify the impacted VM instance, the tentatively scheduled time for the maintenance of the virtual machine instance, and the determined time period that the VM instance may be unavailable for use. The service may be configured with a communications modality to allow the customer to respond to the event by, for example, accepting the proposed migration time, setting a different proposed migration time, setting a window in which the migration should occur, or refusing the migration. The communications modality may be, for example, an application programming interface ("API"), a library, or a web service interface. Based at least in part on the response received using the communications modality, the service may then begin the live migration, schedule the live migration for a later time, or cancel the live migration. Scheduling the migration for a later time may include, for example, entering the migration event (e.g., a live migration event) in a queue for later processing.

In another example, the maintenance event may be related to a patching operation associated with the VM instance. Patching a VM (e.g., applying one or more patches to the operating system or kernel) is an operation that typically requires that the VM instance be restarted or rebooted. When a VM instance is rebooted, the VM instance is not available for use. Typically, the amount of time it takes to reboot a VM instance, and thus the amount of time that the VM instance will be unavailable, is predictable and based at least in part on the size of the VM instance (e.g., the amount of memory and/or other resources associated with the VM instance). A VM reboot may either be performed in place (i.e., the VM is restarted in the same host location) or with a migration (i.e., the VM instance is restarted in a different host location). A reboot with a migration is referred to herein as a "reboot migration" as opposed to a "live migration."

Just as with the live migration maintenance event, a reboot or reboot migration maintenance event may be generated by the service and sent to the customer. The maintenance event may specify the impacted VM instance, the tentatively scheduled time for the migration, and the determined time period that the VM instance will be unavailable for use. As with the live migration event, the customer may use the communications modality (e.g., the API) to respond to the event by accepting the proposed migration, rescheduling the proposed migration, setting a window in which the migration should occur, or refusing the migration.

The customer may also be provided with additional API responses to the event. For example, a customer may have a plurality of VM instances configured to provide an application or service in a distributed and/or cooperative manner. The API may allow the customer with the capability to marshal times when VM instances are rebooted so that, for example, only 5% of the VMs may be shut down and patched at any one time. Similarly, the customer may specify that all VM instances must be shut down and patched at the same time when, for example, the customer is updating the application or service. The API may be used to set the exact time when this group patch and reboot will occur so that the customer can plan for the unavailability of the application or service. As may be contemplated, other maintenance operations may be scheduled and configured to allow a customer to provide feedback using the techniques described herein.

The communications modality (e.g., the API or other such interface) may also be used by the customer to set policies associated with managing the VM instances. Using a live migration as an example, the customer may set policies that a live migration may be scheduled within a time interval (e.g., at any time between a start time of 2:00 AM and an end time of 5:00 AM), or that a live migration may be scheduled any time as long as it takes less than 100 milliseconds, or that a live migration may be performed after a precursor condition is satisfied (e.g., only when the workload on the VM is below a certain threshold). When such policies are used, the service may check the policies prior to sending the maintenance event and, if a policy that applies to the proposed live migration is applicable, may proceed with the live migration without sending the maintenance event. A notification may be sent to the customer indicating that the live migration will be performed at the determined time according to the applicable policy and, in some embodiments, the customer can use the communications modality to cancel and/or otherwise alter the live migration.

In the following description, various techniques will be described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an example environment 100 where feedback for virtual machine instance migration may be received in accordance with an embodiment. In the example illustrated in FIG. 1, a migration manager 116 may receive instance specific data 112 from a customer VM instance 110. The instance specific data 112 may include data and/or metadata associated with the customer instance, which may be used to determine whether the customer VM instance 110 may be a good candidate for migration. For example, the instance specific data 112 may include data about the type of the instance, the size of the instance, the amount of storage of the instance, applications running on the instance, and/or information about resources such as network connections or databases associated with the instance. In the example illustrated in FIG. 1, the migration manager 116 may also receive instance specific workload data 114, which may include the load on the customer VM instance 110. The load on a VM instance is a measurement of the amount of work that a VM instance is performing at a given time and may be based at least in part on a combination of metrics including, for example, the number of input-output operations per second ("IOPS") performed by the VM instance, the number of instructions executed per second by the VM instance, the amount of network traffic per second to and from the VM instance, the amount of memory pages that are changing per second, or other metrics associated with the VM instance.

The instance specific data 112 and/or the instance specific workload data 114 may be static (i.e., may not change during the course of execution of the instance) or may be dynamic (i.e., may change during the course of execution of the instance). In an embodiment where the instance specific data 112 and/or the instance specific workload data 114 includes dynamic data, the migration manager 116 may be configured to receive a plurality of updates of the instance specific data 112 and/or the instance specific workload data 114 during the execution of the instance.

The migration manager 116 may then process the instance specific data 112 and the instance specific workload data 114 to, for example, extract a portion of the instance specific data 112 and/or to sort the instance specific data 112. The migration manager 116 may then store some or all of the instance specific data 112 and/or instance specific workload data 114 in a history data store 118 (e.g., on a storage device and/or within a history database).

In the example illustrated in FIG. 1, the migration manager 116 is configured to gather instance data 122 and/or workload data 124 from other VM instances 120 hosted by the computing resource service provider 104. These other VM instances 120 may include VM instances with capabilities and/or resources that are at least partially similar to the customer VM instance 110. As with the instance specific data 112 and the instance specific workload data 114, the migration manager 116 may process the instance data 122 and workload data 124 from other VM instances 120 and may store the instance data 122 and the workload data 124 in the history data store 118.

The migration manager 116 may then continue receiving instance specific data 112 and/or instance specific workload data 114 from the customer VM instance 110 and, based at least in part on that data, may determine that the customer VM instance 110 may be migrated to a new location as described herein. The migration manager 116 may also determine that the customer VM instance 110 may be migrated to a new location based at least in part on previously recorded instance specific data 112 and/or instance specific workload data 114 stored in the history data store 118. The migration manager 116 may also determine that the customer VM instance 110 may be migrated to a new location based at least in part on previous migrations that may have been executed on the customer VM instance 110. Data and/or metadata associated with these previous migrations may include the workload at the time of the previous migration and may also include data associated with the previous migration such as, for example, the amount of time that the previous migration took and whether the previous migration was successful.

The migration manager 116 may also determine that the customer VM instance 110 may be migrated to a new location based at least in part on instance data 122, workload data 124, and/or data from previous migrations from the other VM instances 120, which may be stored in the history data store 118 as described above. In addition, in embodiments the migration manager 116 may initiate the process of determining whether VM instances may be migrated in response to a request from a customer. For example, the computing resource service provider 104 may offer such an application program interface to customers to determine the kind of impact their particular instance(s) will suffer if they were to request a migration it at that instant in time. The application program interface in this example can be configured to receive requests that include a customer identifier, authentication material for the request, and a command to invoke the migration manager 116. In any case, the migration manager 116 may determine that the customer VM instance 110 may be migrated to a new location based at least in part on instance data 122, workload data 124, and/or data from previous migrations from the other VM instances 120 when, for example, the customer VM instance 110 is a new VM instance and there is a limited amount of data about the customer VM instance in the history data store 118. When the migration manager 116 determines that the customer VM instance 110 may be migrated to a new location based at least in part on instance data 122, workload data 124, and/or data from previous migrations from the other VM instances 120, the migration manager 116 may query the history data store 118 for previous migration data associated with instances that are similar to the customer VM instance 110. For example, there may be previous migration data for a VM instance of the same type, with the same resources, and with a workload that is approximately the same as the workload of the customer VM instance 110. The migration manager 116 may then use that previous migration data to generate the migration event message 126 as described below.

Following a determination by the migration manager 116 that the customer VM instance 110 may be migrated to a new location, the migration manager 116 may determine the impact of the migration (e.g., may determine how long the customer VM instance 110 will be unavailable as a result of the migration) and may send a migration event message 126 to a customer site 102, based at least in part on that impact of the migration. The migration manager 116 may also include a likelihood of success of that migration (i.e., may determine how likely it is that the migration will complete within the determined impact time) and may include that likelihood of success with the migration event message 126.

The migration manager 116 may send that migration event message 126 to the customer site 102 by, for example, transmitting the migration event message 126 to a network address associated with the customer site 102. In an embodiment, the network address is an internet protocol ("IP") address. In another embodiment, the network address is an email address. In another embodiment, the network address is a short message service ("SMS") address. Combinations of these and/or other network addresses may also be used by the migration manager 116 to send the migration event message 126 to the customer site 102. The migration event message 126 may include migration event data 106, the impact of the migration, and the likelihood of success of the migration so that a customer at the customer site 102 may use that information to determine if and how the migration should proceed. For example, the migration event data 106 may include an identifier of the customer VM instance 110 that will be migrated, a proposed time for the migration, a predicted load on the VM instance at the time of the migration, an amount of time that the customer VM instance 110 will be unavailable as a result of the migration, and a confidence measure that the migration will complete within the amount of time. For example, the migration event message 126 may be sent as an API response that is delivered to the customer site 102 (as described above) in response to a request from the customer to determine what impact of a migration of a VM instance would have on that instance. In such an example, the migration event message 126 may include the impact of the proposed migration and may also include one or more proposed times for the proposed migration.

The proposed time for the migration may be a specific time (e.g., 2:00 AM on Tuesday), may be a time window (e.g., between 4:00 PM and 5:00 PM on Tuesday), or a variable time window (e.g., one hour, between 2:00 and 5:00 AM, at some point in the next week). The predicated load on the VM instance may be determined from previously recorded instance specific workload data 114, may be estimated based at least in part on other similar instance migrations, or may be experimentally determined by, for example, installing applications on a VM instance that are configured to simulate various loading conditions. The amount of time that the customer VM instance 110 will be unavailable as a result of the migration may also be determined from previous observations, estimated based at least on previous migrations, or determined experimentally by performing migrations on VM instances with simulated loading.

The confidence measure for the time periods and/or predicted loads associated with the migration event data 106 may be computed based at least in part on the type and extent of data that is used to generate those time periods and/or predicted loads. For example, if the customer VM instance 110 has a predictable load at 2:00 AM, and previous live migrations have all taken between 80 and 90 milliseconds at that time, the confidence measure that a proposed live migration at 2:00 AM on Tuesday would take between 80 and 90 milliseconds would be high (e.g., 95% certain). Conversely, if the customer VM instance 110 has a widely varied load at 2:00 AM, or if this is the first live migration of the customer VM instance, the confidence measure that a proposed live migration at 2:00 AM on Tuesday would take between 80 and 90 milliseconds may be low (e.g., 10% certain). Data from other migrations of other VM instances 120 with similar capabilities and/or of similar types may be used to increase or decrease the confidence measure. For example, if live migrations of VM instances that have the same properties and workloads as the customer VM instance 110 always complete within 90 milliseconds, then the confidence measure may be increased.

The confidence measure for the time periods and/or predicted loads associated with the migration event data may be computed based at least in part on the type and extent of data that is used to generate those time periods and/or predicted loads using one or more analysis techniques. For example, the migration event data may be used to create a model for the migration and the model may then be used for estimation based on a regression function associated with the model. A regression function may be used for estimation by substituting migration data into the regression function. For example, if a model is created (e.g., based on migration history data) with an associated regression function that predicts time to migrate based on time of day and workload, then the regression function can be used to predict the time to migrate for a given time of day and workload. The confidence measure for the prediction can then be established from error analysis of the migration data, experimental verification, or other such techniques. In an embodiment, the confidence measures are first estimated from error analysis of the migration data and then iteratively improved from data gathered during each migration.

After receiving the migration event message 126, a customer at the customer site 102 may use the migration event data 106 to determine whether a response is required and, if so, may generate an API call 108 to provide the migration manager 116 with migration feedback 128 to enable the migration manager 116 to determine if and/or when to perform the migration. For example, a customer may receive a migration event message 126 with migration event data 106 indicating that a live migration of the customer VM instance 110 will be performed at 2:00 on Tuesday, that the live migration will cause the customer VM instance 110 to be unavailable for 75 milliseconds, and that the confidence measure for those numbers is 50%. Based at least in part on that confidence measure, the customer at the customer site 102 may want to provide feedback for the proposed migration using the feedback API.

In a first example of migration feedback 128, the customer at the customer site 102 may accept the proposed migration even though the confidence is not high because, for example, an application associated with the customer VM instance 110 is tolerant of losing the customer VM instance 110 even if the migration takes longer than 75 milliseconds. In a second example of migration feedback 128, the customer at the customer site 102 may accept the proposed migration only if it can be completed within 1000 milliseconds with high confidence. The migration manager 116 may then determine whether the migration can be completed within 1000 milliseconds at that time. In a third example of migration feedback 128, the customer at the customer site 102 may reject the proposed migration because, for example, the customer is planning on performing critical system processes at that time. When a customer at the customer site 102 rejects a proposed migration, the customer at the customer site 102 may propose an alternative time for the proposed migration and/or an alternative time window for the proposed migration. As may be contemplated, the examples of types of migration feedback described herein are merely illustrative examples and other such types of migration feedback may be considered as within the scope of the present disclosure.

In the example illustrated in FIG. 1 and throughout this application, the feedback techniques described are illustrated in conjunction with a VM instance migration; however, the techniques illustrated may also be used to manage other maintenance operations associated with a VM instance including, but not limited to, applying software updates, installing software, patching the operating system or kernel, applying security patches, or other maintenance operations. Similarly, in the example illustrated in FIG. 1, the feedback operations are illustrated as being managed by a migration manager 116, but such feedback operations may also be managed by another system or service associated with the VM instance including, but not limited to, a hypervisor, an operating system, a VM service, or some other such management system or service. As may be contemplated, the maintenance operations described herein and the system used to manage the feedback associated with those maintenance operations are merely illustrative examples and other maintenance operations and/or systems used to manage feedback associated with those maintenance operations may be considered as within the scope of the present disclosure.

Figure 2:
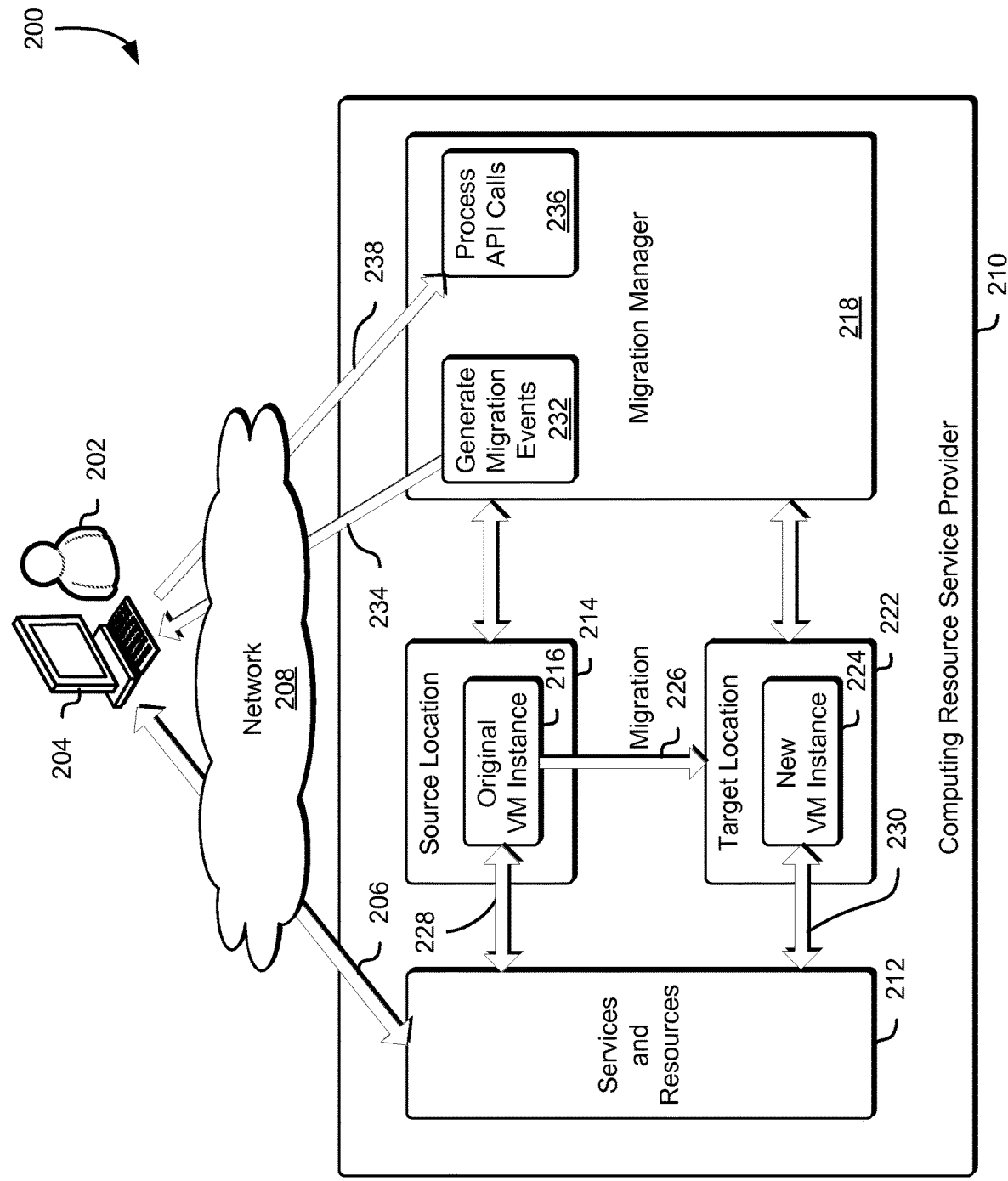
FIG. 2 illustrates an example environment where events associated with the migration of a virtual machine instance are managed.

FIG. 2 illustrates an example environment 200 where events associated with the migration of a virtual machine instance are managed as described in FIG. 1 and in accordance with at least one embodiment. As with the example illustrated in FIG. 1, the techniques are illustrated in connection with the migration of a VM instance; however, the techniques described herein may also be used in connection with other VM instance maintenance operations such as, for example, patching a VM instance. A user 202 may connect 206 (e.g., send a request) to one or more services and resources 212 through a computer system client device 204. The services and resources 212 may be provided by a computing resource service provider 210. In some embodiments, the computing resource service provider 210 may provide a distributed, virtualized, and/or datacenter environment within which one or more applications, processes, services, VMs, and/or other such computer system entities may be executed. In some embodiments, the user 202 may be a person, or may be a process running on one or more remote computer systems, or may be some other computer system entity, user, or process.

The command or commands to the services and resources may originate from an outside computer system, or from within the computing resource service provider. In some embodiments, the command or commands to initiate the connection 206 to the computing resource service provider 210 may be sent to the services and resources 212, without the intervention of the user 202.

The computing resource service provider 210 may provide access to the one or more host machines, as well as provide access to one or more VM instances as may be operating thereon. In the example illustrated in FIG. 2, a first VM instance (the original VM instance 216) is running in a first location (the source location 214). The first location may be one or more host computer systems configured to provide shared hardware to a virtual computer system service for the instantiation of one or more VM instances. The original VM instance 216 may be one of a plurality of VM instances associated with the source location 214. Each of the plurality of VM instances associated with the source location 214 may be running, may be paused, may be suspended (e.g., paused and stored to secondary storage), or may be in some other state. In the example illustrated in FIG. 2, the original VM instance 216 is running (i.e., is performing one or more operations).

The services provided by the computing resource service provider 210 may also be implemented as and/or may utilize one or more VM instances as may be operating on the host machines. For example, the computing resource service provider 210 may provide a variety of services to the user 202 and the user 202 may communicate with the computing resource service provider 210 via an interface such as a web services interface, an API, or some other type of interface. While the example environment illustrated in FIG. 2 shows a single connection or interface for the services and resources 212 of the computing resource service provider 210, each of the services may have its own interface and, generally, subsets of the services may have corresponding interfaces in addition to or as an alternative to the single interface.

The computing resource service provider 210 may provide various services and resources to its users or customers such as the services and resources 212. The services and resources provided by the computing resource service provider 210 may include, but may not be limited to, virtual computer system services, block-level data storage services, cryptography services, on-demand data storage services, notification services, authentication services, policy management services, or other services as well as the resources associated with such services (e.g., storage devices, network connections, host machines, and other resources). Not all embodiments described may include all of these services and/or resources, and additional services and/or resources may be provided in addition to or as an alternative to the services and resources explicitly described. As described above, each of the services may include one or more webservice interfaces that enable the user 202 to submit appropriately configured API requests to the various services through webservice requests. In addition, each of the services may include one or more service interfaces that enable the services to access each other (e.g., to enable a VM instance provided by the virtual computer system service to store data in or retrieve data from an on-demand data storage service and/or to access one or more block-level data storage devices provided by a block-level data storage service).

In an example, a virtual computer system service may be a collection of computing resources configured to instantiate VM instances on behalf of a customer such as the user 202. The customer may interact with the virtual computer system service (via appropriately configured and authenticated API requests) to provision and operate VM instances that are instantiated on physical computing devices hosted and operated by the computing resource service provider 210. The virtual computer system service may also be configured to initiate the migration of VM instances as described herein. The VM instances may be used for various purposes, such as to operate as servers supporting a website, to operate business applications or, generally, to serve as computing power for the customer. Other applications for the VM instances may be to support database applications, electronic commerce applications, business applications, and/or other applications.

In another example, a block-level data storage service may comprise one or more computing resources that col- lectively operate to store data for a customer using block-level storage devices (and/or virtualizations thereof). The block-level storage devices of the block-level data storage service may, for example, be operationally attached to VM instances provided by the virtual computer system service described herein to serve as logical units (e.g., virtual drives) for the computer systems. A block-level storage device may enable the persistent storage of data used/generated by a corresponding VM instance where the virtual computer system service may only provide ephemeral data storage for the VM instance.

In the example illustrated in FIG. 2, the one or more services may be implemented as, or may be supported by one or more VM instances as described above. For example, the one or more services may include an original VM instance 216 available to the user 202 (i.e., configured such that the user 202 may use and/or otherwise interact with the original VM instance 216). The original VM instance 216 may be running at first, or source location 214, as described above.

In the course of the operation of the original VM instance 216, it may be determined that one or more proposed maintenance operations may need to be performed on the original VM instance 216, which may cause the original VM instance 216 to become unavailable for a period of time. As described above, in the example illustrated in FIG. 2, the maintenance operation is a migration of the original VM instance 216 from a source location 214 to a target location 222. The determination that the original VM instance 216 can be migrated from the source location 214 to a target location 222 may be made as a result of changes in the availability of resources at the source location 214 (e.g., a shortage of computing power, a shortage of memory, or a lack of network bandwidth) or because a request from a customer was received to, for example, determine the impact of a proposed migration.

The availability of a resource may be absolute (i.e., the resource may be available or not) or may be relative. For example, a virtual machine instance may be running on a host machine with a maximum available network bandwidth of four GB/sec between the host machine (the source location) and another host machine (the target location). If the current working environment is not highly loaded, there may be two GB/sec of available network bandwidth. A virtual machine migration that requires at least one GB/sec of network bandwidth may result in a determination that the original VM instance 216 can be migrated. A virtual machine migration that requires at least three GB/sec of available network bandwidth may result in a determination that the original VM instance 216 cannot be migrated. However, the availability of a resource may also change over time. In the above example, it may be known that the available network bandwidth between the two host machines may be significantly less at a future time (e.g., at 2:00 AM) and so the migration may be performed at that time.

The determination that the original VM instance 216 can be migrated from the source location 214 to a target location 222 may also be made to move the original VM instance 216 logically closer to one or more computing resource service provider resources. The determination that the original VM instance 216 can migrated from the source location 214 to a target location 222 may include determining one or more candidate locations from a set of available candidate locations based on, for example, resource availability, location, cost, or other selection criteria.

The determination that the original VM instance 216 can be migrated from the source location 214 to a target location 222 may also be made by a customer request to, for example, reduce one or more costs associated with the original VM instance 216 or because the customer simply wants the instance to be moved and sends a request to determine the impact of the migration. The determination that the original VM instance 216 can be migrated from the source location 214 to a target location 222 may also be made by a service, process, or module (e.g., the migration manager 116 described in connection with FIG. 1) operating in association with the computing resource service provider that may be configured to determine more optimal locations form VM instances. In the example illustrated in FIG. 2, the target location 222 is shown within the computing resource service provider 210. In an embodiment, either the source location 214, the target location 222, or both can be outside of the computing resource service provider 210 (e.g., they may be provided by customer and/or other third party environments).

The request to migrate the original VM instance 216 from the source location 214 to the target location 222 may be generated by a migration manager 218 operating with the computing resource service provider 210 as described above. In an embodiment, the migration manager 218 is implemented as a service that may be one of a plurality of services provided by the computing resource service provider 210. The migration manager 218 may also be referred to herein as a migration manager computer system and, in some embodiments, can be implemented as a distributed computer system as described herein.

When migrating the original VM instance 216 from the source location 214 to the target location 222, a number of systems, services, processes, and resources may be communicating with the original VM instance 216. These systems, services, processes, and resources cannot generally be guaranteed to change their behavior simultaneously so that their communications switch from the original VM instance 216 at the source location 214 to a new VM instance 224 at the target location 222. The migration manager 218 may be configured to communicate with each of the plurality of systems, services, processes, and resources in order to manage the migration.

The migration manager 218 may be configured to manage the migration by selecting one or more operations to perform based at least in part on the state of the migration and/or the classification of one or more requests (e.g., API requests) and then by performing those selected operations. For example, the migration manager may select and perform one or more operations to determine the proper order for migration, manage a workflow for migration, issue commands to the systems, services, processes, and resources associated with the migration, determine whether the migration is successful, start and stop VM instances, determine whether the migration has failed, determine whether the migration should be cancelled, and manage a migration rollback if errors occur.

Upon determining whether to migrate the original VM instance 216 from the source location 214 to a target location 222, a migration manager 218 may generate one or more migration event 232 messages (such as those described above) and may send 234 those one or more migration event 232 messages to the customer site as described above in connection with FIG. 1 using the network 208. The user 202 may respond to those one or more migration event 232 messages by sending 238 one or more feedback API calls (also as described above in connection with FIG. 1) using the network 208 and the migration manager 218 may perform one or more operations to process 236 those feedback API calls so that the migration may be performed, cancelled, or scheduled for a later time as described herein.

For example, a feedback API call may specify that the migration associated with the migration event message should be performed only at a time when the migration can be completed within two milliseconds. The feedback API call may also specify parameters associated with performing the migration. The migration manager 218 may process 236 the feedback API call and, based on the instance type and size, the previous migrations of the instance, the previous migrations of other instances, the environment of the system, the time of day, and other such factors, may determine that, between 3:00 AM and 5:00 AM, the migration can be completed within two milliseconds. The migration manager may then schedule the migration to occur within that time interval.

Figure 3:
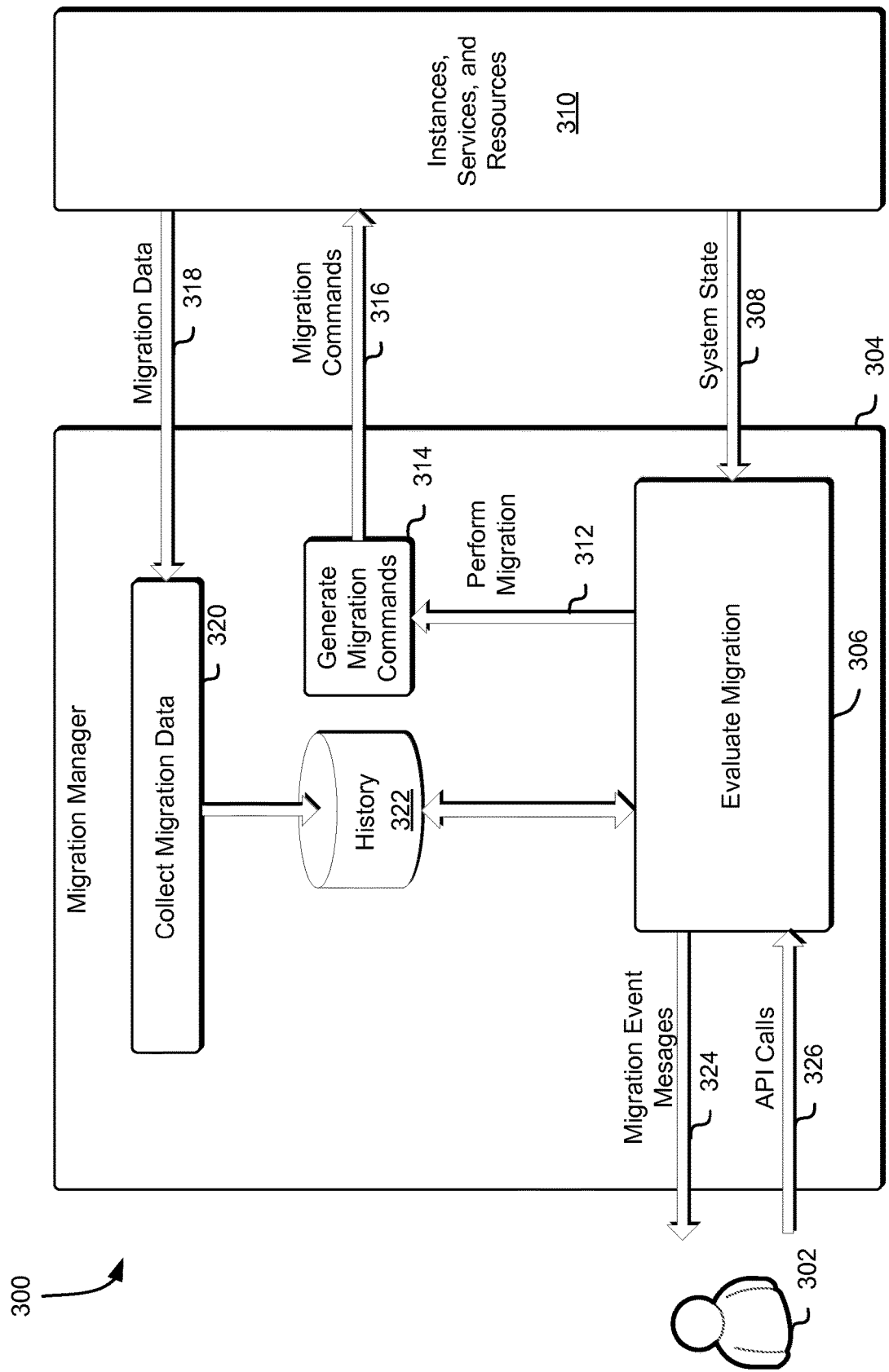
FIG. 3 illustrates an example environment where the likelihood of success of a virtual machine instance migration may be evaluated.

FIG. 3 illustrates an example environment 300 where the likelihood of success of a virtual machine instance migration may be evaluated as described in connection with FIG. 1 and in accordance with an embodiment. A migration manager 304 may evaluate 306 a migration as described above and, based at least in part on that evaluation, may calculate a confidence measure (also referred to herein as a "confidence measure indicating the likelihood of success of the migration" or more simply as a "confidence measure"). The confidence measure may be usable to determine whether a migration is likely to succeed. For example, the migration manager 304 may calculate a confidence measure indicating the likelihood of success of a migration by calculating a probability (e.g., between zero and one) determined from a probability model based at least in part on past migrations (e.g., based at least in part on the confidence measure described above). The migration manager 304 may also calculate a confidence measure indicating the likelihood of success of the migration by examining a system state 308 of the virtual machine instance and determining whether a set of conditions has been satisfied and/or is likely to be satisfied. The confidence measure may be calculated using regression analysis, or using expected value analysis (e.g., using a probability weighted average), or using a heuristic, or using a machine learning model, or using some other analysis technique.

The determination of the likelihood of success of the migration may include evaluating the system state 308 of one or more instances, services, or resources 310. For example, if the system state 308 indicates that a VM is currently experiencing a very high volume of network or storage traffic, that VM may not be a good candidate for migration. The determination of whether the migration is likely to succeed may also include evaluating the migration history 322 (also referred to herein as "migration history data") as described above that may include results of one or more previous VM migrations (also referred to herein as "previous migrations"). The migration history 322 may also include one or more prior system states from one or more previous migrations. For example, if the migration history 322 indicates that a certain type of VM instance is rarely successfully migrated because, for example, one of the steps times out, then that VM may also not be a good candidate for migration.

As a result of determining that the migration is a good candidate for migration, the migration manager 304 may then generate migration event messages 324 as described above and, as a result of receiving one or more API calls 326 from the user 302, may determine if and when to proceed with the migration. When the migration proceeds, the migration manager 304 may perform the migration 312 by generating migration commands 314. The migration commands 316 may be sent to the instances, services, and resources 310 associated with the migration. The migration commands 316 may include commands associated with a live migration such as, for example, commands to pause the VM instance, commands to migrate resources associated with VM instance from the source location to the target location, or commands to resume the VM instance. The migration commands 316 may also include commands associated with a reboot migration such as, for example, commands to shutdown the VM instance, commands to migrate resources associated with the VM instance from the source location to the target location, or commands to restart the VM instance. In an embodiment, the instances, services, and resources are provided by a computing resource service provider, such as the computing resource service provider 104 described in connection with FIG. 1. In another embodiment, some or all of the services and resources are provided by a customer or a third party associated with the computing resource service provider.

During the migration, the system state 308 may be continually monitored by the migration manager 304 so that, for example, spikes in resource demand may be determined. Additionally, migration data 318 may be collected 320 during the migration such as, for example, the length of time that migration steps take to complete (e.g., how long it takes to perform a migration operation associated with a particular service or resource), whether such steps succeed or fail, and/or possible reasons for success or failure. The migration data 318 may be collected 320 and stored in the migration history 322 to inform subsequent migrations as described above.

The system state 308 and/or the migration data 318 may be used to determine whether a migration should occur as described herein, the confidence measure indicating the likelihood of success of that migration, the best time to perform a migration, and/or whether a migration is proceeding without error. Additionally, the system state 308 and/or the migration data 318 may also be used by the migration manager 304 to improve workflows, adjust timeouts, improve memory convergence, improve migration event data, or to determine other parameters associated with a migration. The migration manager 304 may also include a machine learning system configured to receive the system state 308 and/or the migration data 318 and evaluate it against the migration history 322 to improve workflows, adjust timeouts, improve memory convergence, improve migration event data, or to determine other parameters associated with a migration. The machine learning system may also be configured to improve determinations about when and how to cancel a migration and/or to improve determinations about which migrations are especially good (or especially bad) candidates. Additionally, although not illustrated in FIG. 3, the system state 308 may also be used in conjunction with a migration workflow to, for example, alter the workflow, make workflow decisions (e.g., to perform certain actions in response to changes in the system state 308), or to execute workflow steps such as, for example, to perform cleanup, cancel, or rollback operations associated with the migration.

Figure 4:
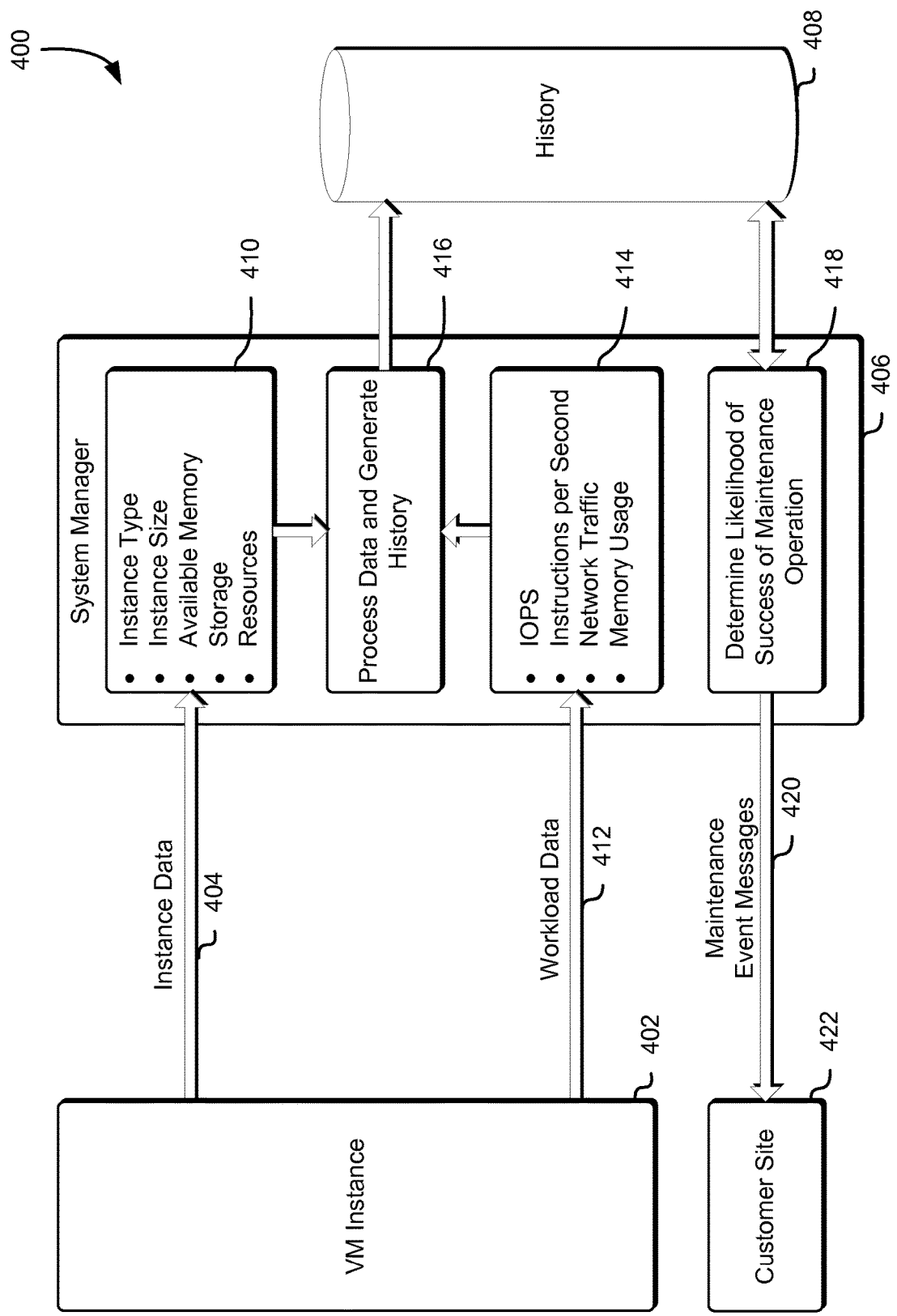
FIG. 4 illustrates an example environment where maintenance events associated with virtual machine instances may be generated.

FIG. 4 illustrates an example environment 400 where maintenance events associated with virtual machine instances may be generated as described in connection with FIG. 1 and in accordance with an embodiment. It should be noted that, as used herein, a "maintenance event" may include any event associated with the performance of any operation on the virtual machine instance. For example, a live migration, a reboot migration, and a reboot with a patch are all maintenance operations that may be performed on a virtual machine instance, which may be associated with maintenance events. Additionally, adding or removing resources, evaluating performance, or providing software licenses may also be considered maintenance operations. Maintenance events may be generated by the computing resource service provider (e.g., to rebalance instances, to obtain higher utilization of hardware, and/or to improve the efficiency of a collection of virtual machine instances). Maintenance events may also be generated by a customer of the computing resource service provider to, for example, update software or improve performance by migrating a virtual machine instance closer to customers or to important resources.

In the example illustrated in FIG. 4, a system manager 406 (e.g., the migration manager 116 described in connection with FIG. 1) may gather instance data 404 and workload data 412 from a VM instance 402. The instance data 404 may include instance data elements 410 including, but not limited to, the instance type, the instance size, the amount of memory associated with the instance, the amount and type of storage associated with the instance, and other resources associated with the instance (e.g., databases, secondary storage, or specialized hardware). The workload data 412 may include workload data elements 414 including, but not limited to, IOPS, instructions executed per second, network traffic, and memory usage.

In the example illustrated in FIG. 4, the instance data elements 410 are data that remains constant and/or static while the VM instance runs and the workload data elements 414 are data that changes and/or is dynamic while the VM instance runs. For example, the instance type, size, and available memory of a VM instance do not usually change while the VM instance is running. The storage and/or other resources associated with the VM instance may change while the VM instance is running, but do not change frequently. In an embodiment, any change to the storage and/or resources associated with a VM instance would be a change to a new instance type with different storage and/or resources. Conversely, IOPS, instructions per second, network traffic, and memory usage often change frequently while a VM instance runs. It should be noted that memory usage may be related to instructions per second and may also include how much memory is free, how much is used, how often the memory is changing, or other memory usage metrics. This dynamic data may be gathered at different granularities such as, for example, every hour, every minute, every second, etc. This dynamic data may also be gathered in a "snapshot" and processed and/or analyzed later. In an embodiment, a data element that exceeds (or falls below) a threshold can cause the gathering behavior to change. For example, if the instructions per second of a running VM instance falls below a threshold value, the dynamic data may be gathered at a much lower rate. Conversely, if the IOPS of a running VM instance rises above a threshold value, the dynamic data may not be gathered at all for that instance because, for example, the instance may be too busy to be a good candidate for any maintenance operations.

The system manager 406 may then process 416 the instance data elements 410 and the workload data elements 414 to generate the history that may be stored in the history 408 data store as described above. The system manager 406 may then use the data in the history 408 data store to determine 418 the likelihood of success of a proposed maintenance operation (e.g., a live migration, a patch requiring a reboot migration, a software update, etc.). The history data store 408 may also include maintenance operation benchmarks produced from the analysis of previous maintenance operations and these benchmarks may be adjustable based on changes in the working environment of the VM instance. The working environment of a VM instance may include the physical location of the host of the VM instance, network traffic into and/or out of that host, the time of data, available resources for the VM instance and/or the host, or other such working environment elements. For example, a VM instance may be operating on a host machine that is on a rack of such host machines in a datacenter operated by a computing resource service provider. The datacenter may be one of a plurality of such datacenters located in several geographical locations around the world. The working environment of the VM instance may include resources and/or other environment factors associated with the host machine, the rack, the datacenter, and the plurality of datacenters and may also include resources and/or other environment factors associated with the racks, the host machines, or the virtual machine instances of those other datacenters.

For example, a customer may have a VM instance of a certain instance type and size, with 2 GB of available memory, and with no additional resources. The instance may typically have 900 MB of that memory in use, have 20 MB of that memory in frequent use, be sending and/or receiving ten network packets per second, and may be performing one IOPS. The customer may also have a requirement that no downtime to this VM instance that exceeds five milliseconds is allowed. The history data store may include a benchmark that indicates that the live migration of a VM instance of that type, size, memory, and workload would generally complete within three milliseconds and this benchmark may be based on a large number of previously performed live migrations. Considering only the benchmark, it is likely that the live migration can be completed within the five millisecond time limit specified by the customer.

However, if the current working environment for the virtual machine instance is one of high network traffic, heavy host loading, or a particularly busy time, the three millisecond migration may be increased to, for example, six milliseconds. In such a case, the migration may be delayed to a later time to conform to the customer requirement. The benchmark data may also include certain resource requirements that are needed to meet the benchmark. For example, previous migration data may indicate that the live migration of a VM instance of the type, size, memory, and workload would generally complete within three milliseconds but only if there is 2 GB/sec available network traffic between the source location and the target location. The system manager may then use the available network traffic and the benchmark to determine the likelihood of success.

It should be noted, that a maintenance operation on a heavily loaded VM instance may still be accepted by a customer if, for example, the customer or user accepts the impact. For example, the reboot migration of a very large instance may take several additional minutes to perform as compared to, for example, a smaller instance. A customer may, upon being informed of this additional impact, still choose to move forward with the migration.

The system manager may determine a time, an impact, and a likelihood of success of a proposed maintenance operation and if, based at least in part on information about the proposed maintenance operation, it is determined that the proposed maintenance operation can be performed at a certain time and according to a specified service level agreement ("SLA"), the system manager may generate one or more maintenance event messages 420 and may send the one or more maintenance event messages 420 to a customer site 422 as described above. One example of a maintenance event message is the migration event message described above, wherein the maintenance event is a migration event and the maintenance operation associated with the event is a migration of a virtual machine instance from a source location to a target location. The information may include information such as, for example, instance data or workload data as described herein. The specified service level agreement may, for example, specify that any disruption to a virtual machine instance and the maximum downtime for that virtual machine instance must be less than 100 milliseconds for a live migration and must be less than five minutes for a reboot.

In an embodiment, the history data store 408 is a database and the data is stored so that it may be indexed and accessed using one or more data criteria. For example, after having stored a plurality of history entries, the system manager 406 may use the history data to determine whether a VM instance is a good candidate for migration based at least in part on querying the history data store 408 for past migrations of that VM instance. If there are no past migrations for that VM instance, the system manager 406 may query the history data store 408 for previous migrations of virtual machine instances that have similar characteristics as the VM instance. Previous migrations of virtual machine instances that have similar characteristics as the VM instance may include VM instances of the same instance type, the same (or similar) instance size, or with the same workload, or with the same resources, or with other similar characteristics.

Figure 5:
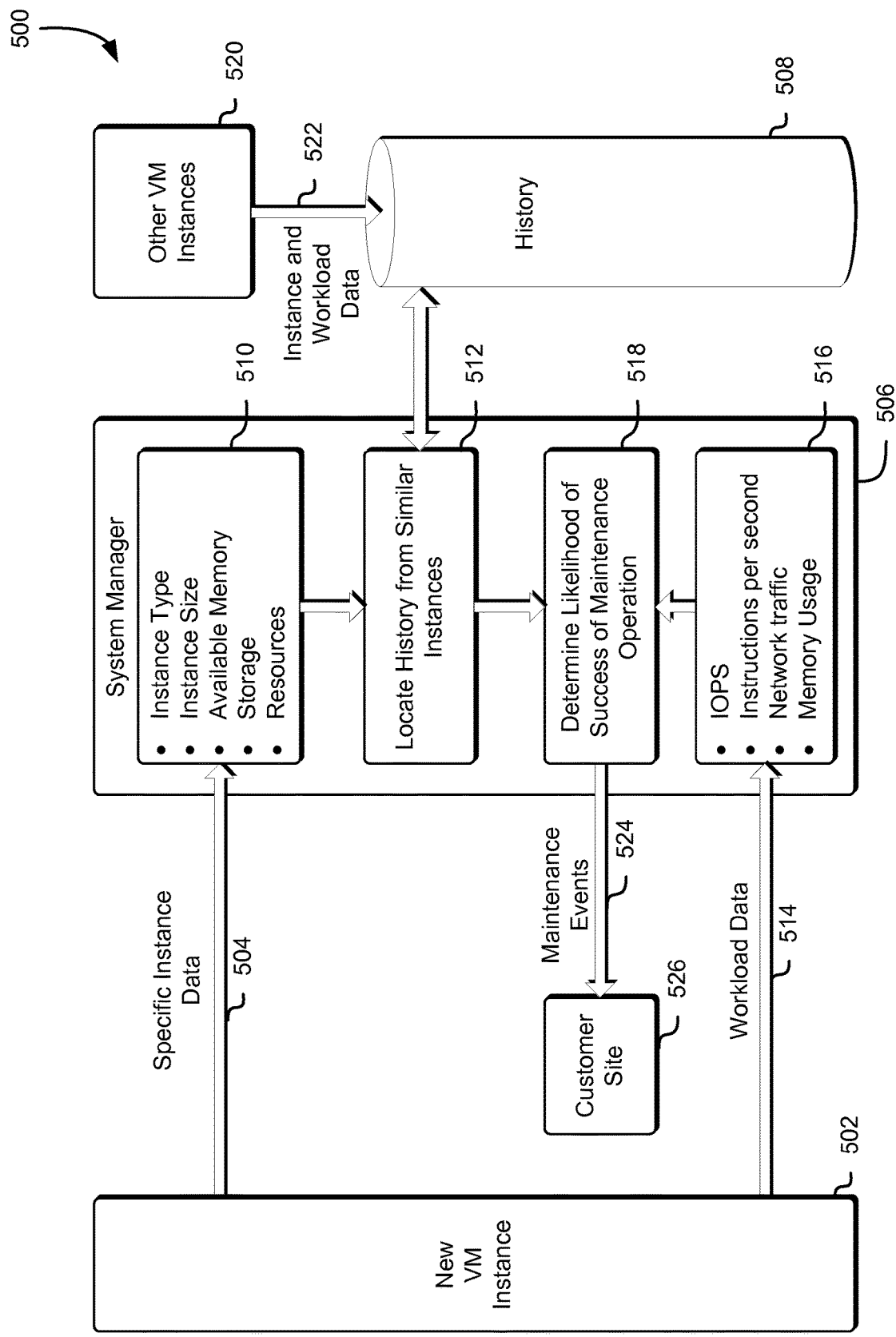
FIG. 5 illustrates an example environment where maintenance events associated with new virtual machine instances may be generated.

FIG. 5 illustrates an example environment 500 where maintenance events associated with new virtual machine instances may be generated as described in connection with FIG. 1 and in accordance with an embodiment. In the example illustrated in FIG. 5, a system manager 506 (e.g., the migration manager 116 described in connection with FIG. 1) may gather specific instance data 504 and workload data 514 from a new VM instance 502 such as the instance data and workload data described above. In the example illustrated in FIG. 5, the history 508 data store includes instance and workload data 522 from other VM instances 520, but does not include instance and workload data from the new VM instance 502 because, for example, the new VM instance may have not been operating long enough to produce any previous instance and workload data in the history data store 508.

The system manager 506 may then locate 512 history and workload data from similar instances in the history 508 data store using the instance data elements 510 and may use the instance and workload data from the similar instances to determine 518 the likelihood of success of a proposed maintenance operation (e.g., a live migration, a patch requiring a reboot migration, a software update, etc.). The system manager 506 may, for example, locate 512 history and workload data from similar instances in the history 508 data store by locating entries in the history 508 data store with the same instance type or size. The system manager 506 may also use the workload data elements 516 to determine 518 the likelihood of success of a proposed maintenance operation as the likelihood of success of a proposed maintenance operation may depend at least in part on the current workload of the new VM instance 502. For example, a live migration may be very likely to succeed if the new VM instance 502 is only 10% loaded, but may be very unlikely to succeed if the new VM instance 502 is 90% loaded. If it is determined that the proposed maintenance operation can be performed at a certain time and within a predetermined amount of time, such as, for example, according to predetermined amount of time, according to a specified SLA, the system manager may generate one or more maintenance events 524 and may send the one or more maintenance events 524 to a customer site 526 as described above.

Figure 6:
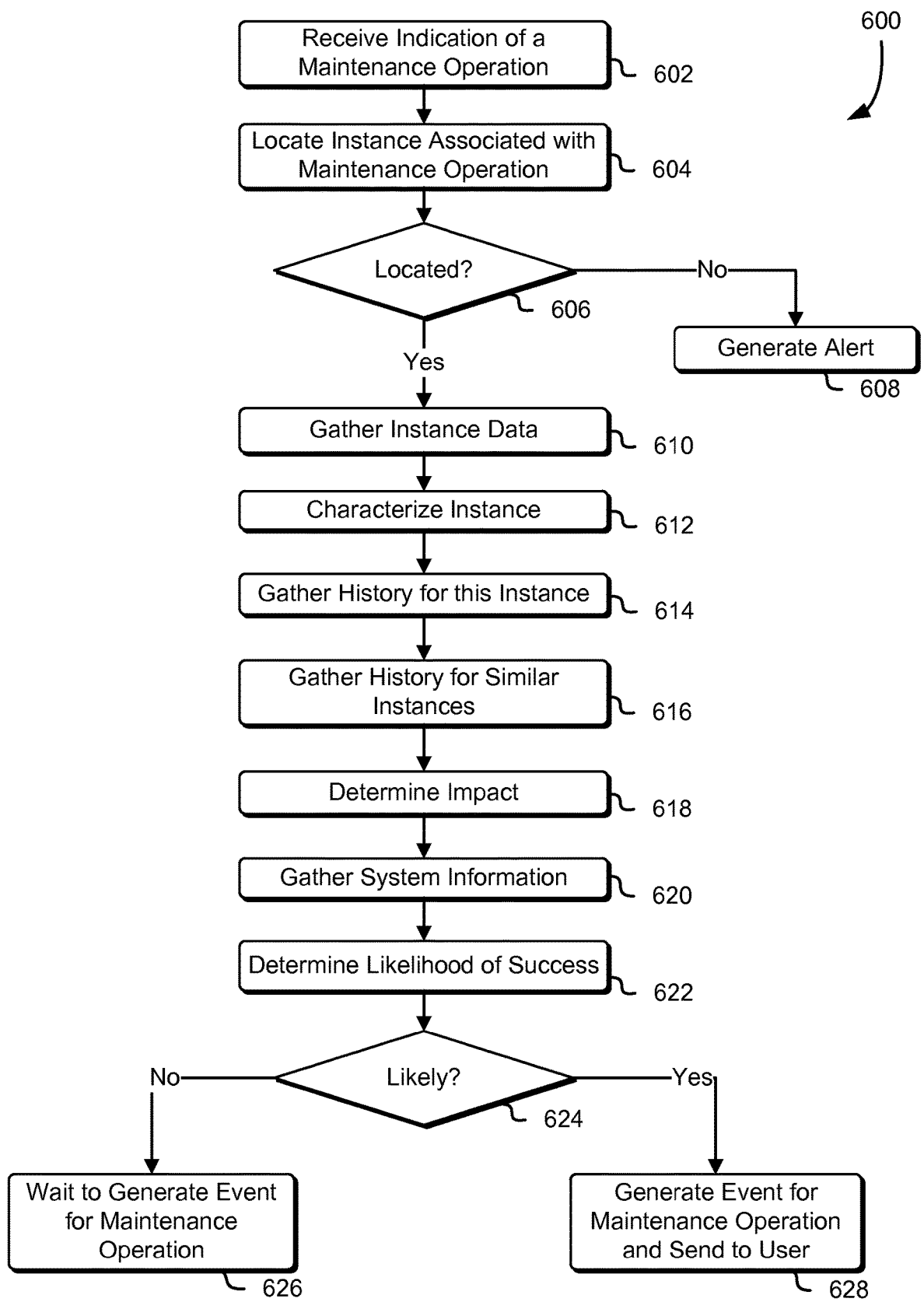
FIG. 6 illustrates an example process for determining the likelihood of success for a maintenance operation associated with a virtual machine instance.

FIG. 6 illustrates an example process 600 for determining the likelihood of success for a proposed maintenance operation associated with a virtual machine instance as described in connection with FIG. 1 and in accordance with an embodiment. A migration manager, such as the migration manager 116 described in connection with FIG. 1, may perform the process illustrated in FIG. 6. A system manager such as the system manager 406 described in connection with FIG. 4 may also perform the process illustrated in FIG. 6.

The system or migration manager may first receive 602 an indication of a proposed maintenance operation associated with a VM instance (also referred to herein simply as a "maintenance operation"). The indication of the maintenance operation may be received from the owner of the VM instance, or may be received from a service such as a software update service, or may be generated by the system or migration manager. The system or migration manager may then locate 604 the instance associated with the maintenance operation. Depending on the maintenance operation, there may be a plurality of VM instances associated with the maintenance. For example, if the maintenance operation is to patch an application running on each of twenty VM instances, then there may be twenty VM instances that must be located.

If the VM instance cannot be located 606, the system or migration manager may generate an alert 608 and forward that alert to an entity associated with the indication of the maintenance operation (e.g., the user or the service). If the VM instance can be located 606, the system or migration manager may then gather 610 instance data from the VM instance as described above and may use that instance data to characterize 612 the VM instance according to, for example, the instance type, the instance size, the resources associated with the instance, and/or other such instance characteristics as described above.

The system or migration manager may then use the characterization of the VM instance to gather 614 any history of past maintenance operations for the VM instance from, for example, a history data store such as the history data store 118 described in connection with FIG. 1. The system or migration manager may also use the characterization of the instance to gather 616 any history of past maintenance operations for instances that are similar to the instance from the history data store.

In an embodiment, using the characterization of the instance to gather 616 any history of past maintenance operations for instances that are similar to the instance includes gathering data from maintenance operation benchmarks, which may be gathered and/or aggregated from past maintenance operations performed on other VM instances. For example, a computing resource service provider may perform a large number of maintenance operations and may record the predicted time and/or the actual time of each maintenance operation. The computing resource service provider may then use such data to produce maintenance operation benchmarks for the maintenance operations (i.e., to produce an experimentally determined prediction of the amount of time a particular maintenance operation may take for a particular category of instance). Such maintenance operation benchmarks may be used in conjunction with using the characterization of the instance to gather 616 any history of past maintenance operations and determine the impact of the maintenance operation as described below.

The system or migration manager may then use that history to determine 618 the impact of the maintenance operation on the VM instance. For example, the system or migration manager may use the history and/or the past history (including the benchmarks) to determine whether a particular maintenance operation would have a five millisecond impact on the of the VM instance (i.e., that the VM instance would be unavailable for five milliseconds if the maintenance operation were performed). The system or migration manager may then gather 620 additional system information such as, for example, the load on the system, the time of day, the amount of network traffic, and other system information and may use that data to determine 622 a likelihood of success for the maintenance operation (i.e., to determine whether the determined impact is likely to be met or bettered). For example, the impact of a maintenance operation may be determined to be five milliseconds, but the system load or the time of day may make it extremely unlikely that it would take less than ten milliseconds to complete maintenance operation (i.e., that there would be less than ten seconds of downtime). In this example, the likelihood of success for completing the migration in five milliseconds would be low. Conversely, in this example, the likelihood of success for completing the migration in ten milliseconds may be high. In another example, the impact of a maintenance operation may be determined to be ten milliseconds at 2:00 PM, but may be two milliseconds at 2:00 AM. In this example, the likelihood of success may be based at least in part on what time the proposed maintenance operation is scheduled for.

The system or migration manager may also use other methods such as, for example, heuristic methods, to determine 622 the likelihood of success of the maintenance operation. The system or migration manager may also use a combination of the history of past maintenance operations for the instance, the history of past maintenance operations for instances that are similar to the instance, the history of migrations for other instances associated with this customer, and/or other methods to determine the likelihood of success for the maintenance operation.

If it is determined that the maintenance operation is likely 624 to succeed, the system or migration manager may generate 628 an event for the maintenance operation and send the event to the user as described above. For example, if it is determined that a patch requiring a reboot of a VM instance is likely to succeed within a time governed by the SLA associated with the VM instance, then the system or migration manager may generate 628 an event indicating that this patch and reboot will occur at a determined time. Conversely, if it is determined that the maintenance operation is not likely 624 to succeed, the system or migration manager may wait 626 to generate the event associated with the maintenance operation and may instead put the maintenance operation in an operation queue for later processing or may ignore the event and simply wait for it to be regenerated as a result of other processes or events associated with the VM instance.

Figure 7:
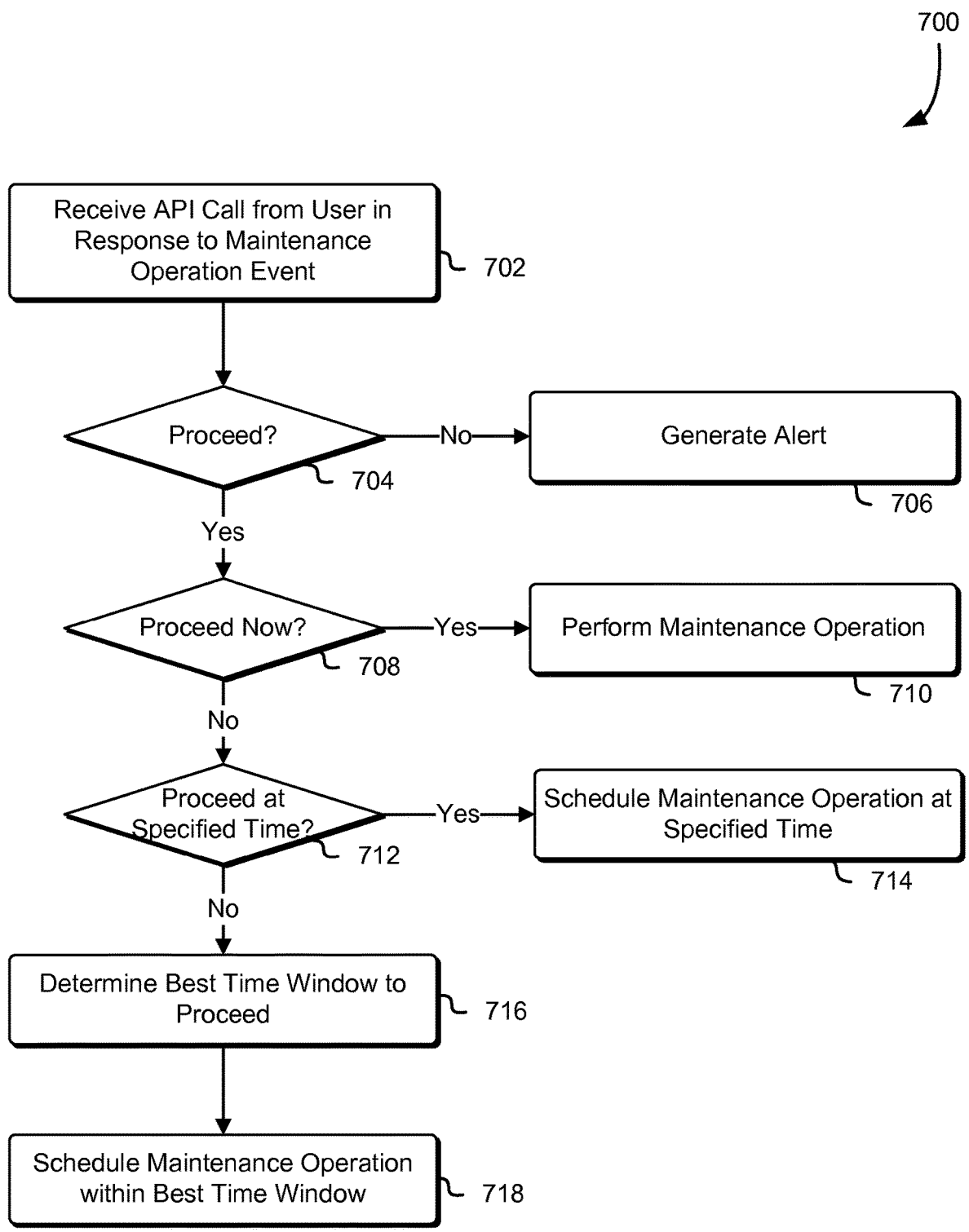
FIG. 7 illustrates an example process for receiving a feedback application programming interface request in response to a maintenance operation associated with a virtual machine instance.

FIG. 7 illustrates an example process 700 for receiving a feedback application programming interface request in response to a maintenance operation associated with a virtual machine instance as described in connection with FIG. 1 and in accordance with an embodiment. A migration manager, such as the migration manager 116 described in connection with FIG. 1, may perform the process illustrated in FIG. 7. A system manager such as the system manager 406 described in connection with FIG. 4 may also perform the process illustrated in FIG. 7.

The system or migration manager may first receive 702 a feedback application programming interface request in response to a maintenance event such as those described herein. The feedback application programming interface request may specify one or more responses to the maintenance operation associated with the maintenance event including, but not limited to, an indication to proceed with the maintenance operation, an indication to proceed with the maintenance operation at a certain time, an indication to proceed with the maintenance operation when some conditions are met, or an indication to not proceed with the maintenance operation. If the feedback application programming interface request specifies that the system or migration manager should not proceed 704 with the maintenance operation, then the system or migration manager may generate 706 an alert and forward that alert to an entity associated with the maintenance operation (e.g., the user or the service that requested the operation).

If the feedback application programming interface request specifies that the system or migration manager should proceed 708 with the maintenance operation now, then the system or migration manager may perform 710 the maintenance operation. It should be noted that the feedback API call may specify that the system or migration manager should proceed with the maintenance operation now, even if the maintenance event specifies a later time. That is, the feedback application programming interface request may specify that the system or migration manager should proceed with the maintenance operation before the maintenance operation was originally schedule if, for example, the user determines that the current time is a more ideal time for the maintenance operation.

If the feedback application programming interface request specifies that the system or migration manager should proceed 712 with the maintenance operation at a specified time, then the system or migration manager may schedule 714 the maintenance operation at the specified time. As described above, the specified time may include an exact time, a time window, or any time window within a determined period. Conversely, if the feedback application programming interface request does not specify that the system or migration manager should proceed 712 with the maintenance operation at a specified time, then the system or migration manager will perform one or more operations to determine 716 the best time window to proceed with the maintenance operation and may schedule 718 the maintenance operation accordingly.

Figure 8:
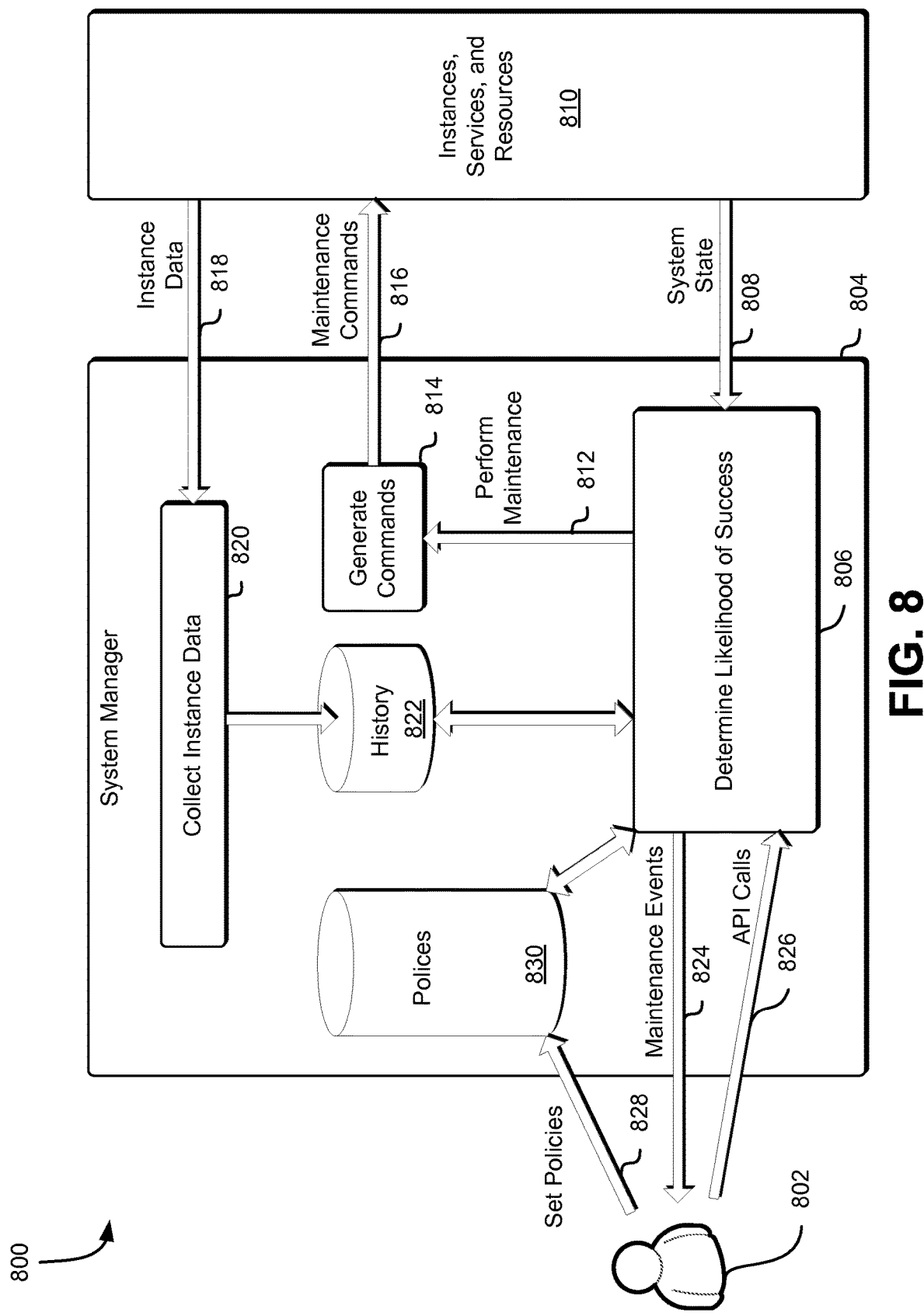
FIG. 8 illustrates an example environment where the likelihood of success of a virtual machine maintenance operation may be evaluated based at least in part on maintenance policies.

FIG. 8 illustrates an example environment 800 where the likelihood of success of a virtual machine maintenance operation may be evaluated based at least in part on maintenance policies associated with the virtual machine maintenance operation as described in connection with FIG. 1 and in accordance with an embodiment. The maintenance policies associated with the virtual machine maintenance operation (also referred to herein as "virtual machine maintenance policies") may specify one or more conditions associated with the maintenance policy and one or more responses that may be generated if the conditions are satisfied. A system manager 804 may evaluate a virtual machine maintenance operation to determine the likelihood of success 806 of that maintenance operation using the techniques described above. In the example illustrated in FIG. 8, the system manager 804 may determine a likelihood of success 806 of the maintenance operation by examining a system state 808 associated with one or more instances, services, or resources 810 associated with a virtual machine instance and determining whether a set of conditions has been satisfied and/or is likely to be satisfied.

As was described in connection with FIG. 3, the system manager 804 may determine a likelihood of success 806 of the virtual machine maintenance operation by evaluating the system state 808 of one or more instances, services, or resources 810 and/or evaluating the history 822 of previous virtual machine maintenance operations. Then, as a result of determining that the operation is a good candidate, the system manager 804 may generate virtual machine instance maintenance event messages 824 as described above and, as a result of receiving one or more API calls 826 from the user 802, may determine if and when to proceed with the maintenance operation. In the example illustrated in FIG. 8, the system manager 804 may first check one or more maintenance policies 830 that may be set 828 by the user before sending the one or more virtual machine instance maintenance event messages 824. For example, if the user 802 has set 828 a policy that any maintenance operation that requires a reboot can be performed between 2:00 AM and 5:00 AM, and the maintenance operation is scheduled to occur within that time window, then it may not be necessary for the system manager 804 to send virtual machine instance maintenance event messages 824 associated with that maintenance operation because, in this example, the user 802 has already specified that this type of maintenance operation may proceed.

In another example, a user 802 may set 828 a policy that every proposed maintenance operation must receive explicit approval by the user before it is performed. In such an example, even if the maintenance operation can be performed so that there is no discernable impact to a virtual machine instance belonging to that user, the operation will only be performed if the user sends a feedback API response authorizing the operation. Such a policy may be associated with a customer who has critical uptime issues where the customer applications cannot tolerate any impact at all.

When the maintenance operation proceeds, the system manager 804 may perform the maintenance operation 812 by generating maintenance commands 814 and sending 816 the maintenance commands to the instances, services, and resources 810 associated with the virtual machine instance. In an embodiment, the instances, services, and resources 810 are provided by a computing resource service provider, such as the computing resource service provider 104 described in connection with FIG. 1. In another embodiment, some or all of the services and resources are provided by a customer or a third party associated with the computing resource service provider.

Figure 9:
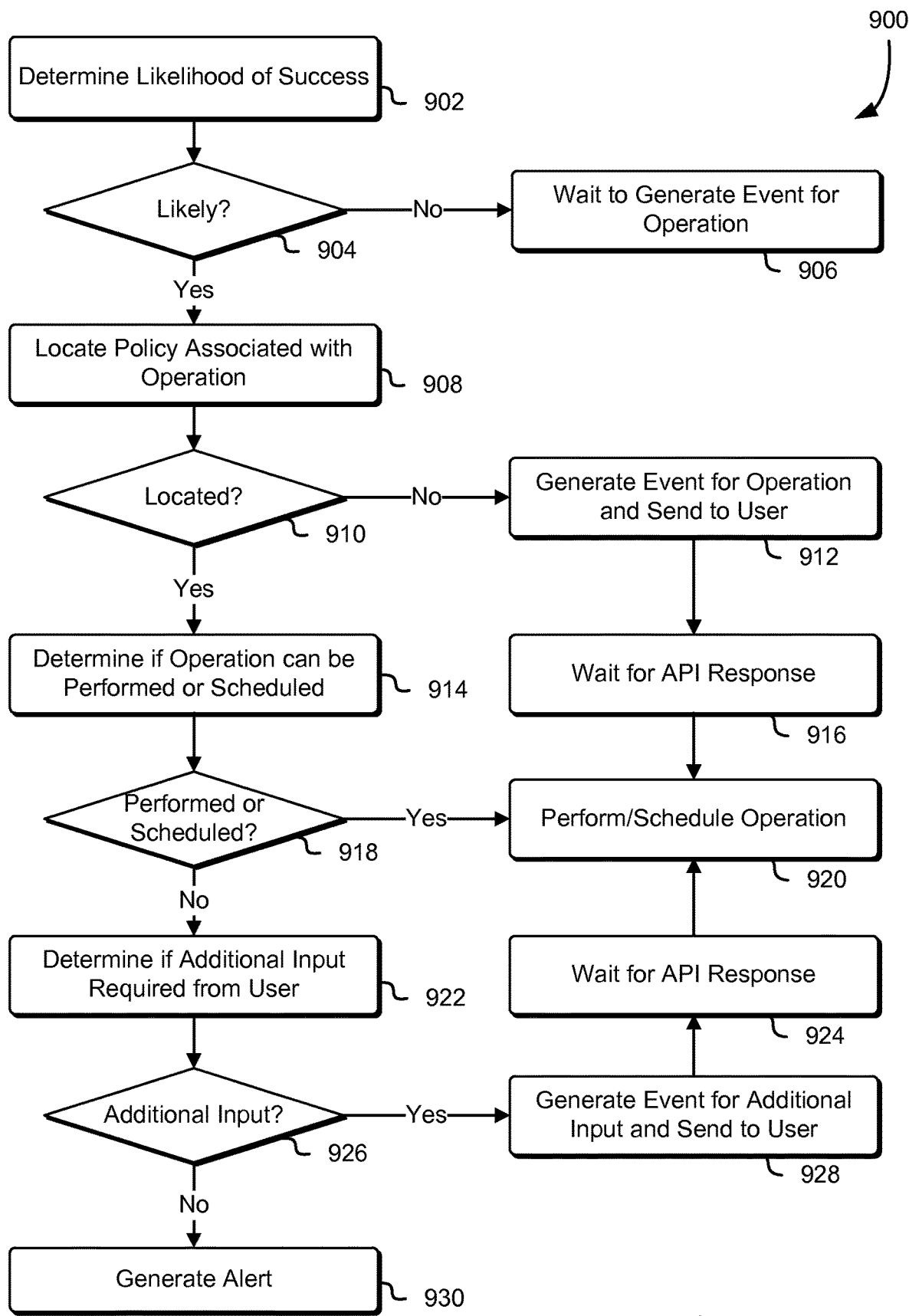
FIG. 9 illustrates an example process for performing a virtual machine maintenance operation based at least in part on maintenance policies.

FIG. 9 illustrates an example process 900 for performing a virtual machine maintenance operation based at least in part on maintenance policies associated with the virtual machine maintenance operation as described in connection with FIG. 1 and in accordance with an embodiment. A migration manager, such as the migration manager 116 described in connection with FIG. 1, may perform the process illustrated in FIG. 9. A system manager such as the system manager 406 described in connection with FIG. 4 may also perform the process illustrated in FIG. 9.

The system or migration manager may first determine 902 the likelihood of success of the maintenance operation (e.g., a live migration or a patch operation) as described above and, if it is not likely 904 that the maintenance operation will succeed, the system or migration manager may wait 906 to generate the event for the operation until it is at least more likely that the maintenance operation will succeed. Conversely, if it is likely 904 that the maintenance operation will succeed, the system or migration manager may first attempt to locate 908 a policy associated with the operation. For example, if the maintenance operation is a live migration, a migration manager may see if the customer associated with the virtual machine instance to be migrated has set any policies for live migrations. An example policy for live migration would be to allow any live migration that can be completed within 100 milliseconds with high certainty. Another example policy for live migration would be to deny any live migration that cannot be completed within 500 milliseconds.

If no policy associated with the operation is located 910, the system or migration manager may generate 912 an event for the operation and send the event to the user as described above. The system or migration manager may then wait 916 for a feedback API response from the user, which may be used to perform or schedule 920 the maintenance operation. Conversely, if a policy associated with the operation is located 910, the system or migration manager may attempt to apply that policy to determine 914 whether the operation may be performed or scheduled. Using the two live migration policies described above, a live migration that can be completed in 90 milliseconds with a high certainty can be performed or scheduled, a live migration that can be completed in 90 milliseconds, but with low certainty may or may not be able to be performed or scheduled, and a live migration that can only be completed in 1000 milliseconds may not be able to be performed or scheduled.

If the operation may be performed or scheduled 918, the system or migration manager may perform or schedule 920 the maintenance operation. Conversely, if the operation may not be performed or scheduled 918, the system or migration manager may determine 922 whether additional input is required from the user. Again using the two live migration rules described above, the live migration that can only be completed in 1000 milliseconds cannot be performed or scheduled according to the policy and thus, no additional input is required from the user. Conversely, the live migration that can be completed in 90 milliseconds, but with low certainty may or may not be able to be performed or scheduled and so additional input is required from the user to determine whether or not to perform the live migration.

In the example of the live migration that can only be completed in 1000 milliseconds and thus cannot be performed or scheduled according to the policy, no additional input 926 is required from the user. In such an example, the system or migration manager may proceed as if the user had sent a feedback API response instructing the system or migration manager not to proceed and, as a result, may generate 930 an alert and forward that alert to an entity associated with the maintenance operation (e.g., the user or the service that requested the operation). Conversely, in the example of the live migration that can be performed within 90 milliseconds but with low certainty, additional input 926 is required from the user. In such an example, the system or migration manager may generate 928 an event requesting additional input from the user and may wait 924 for a feedback API response. Based on that feedback API response, the system or migration manager may perform or schedule 920 the maintenance operation.

Figure 10:
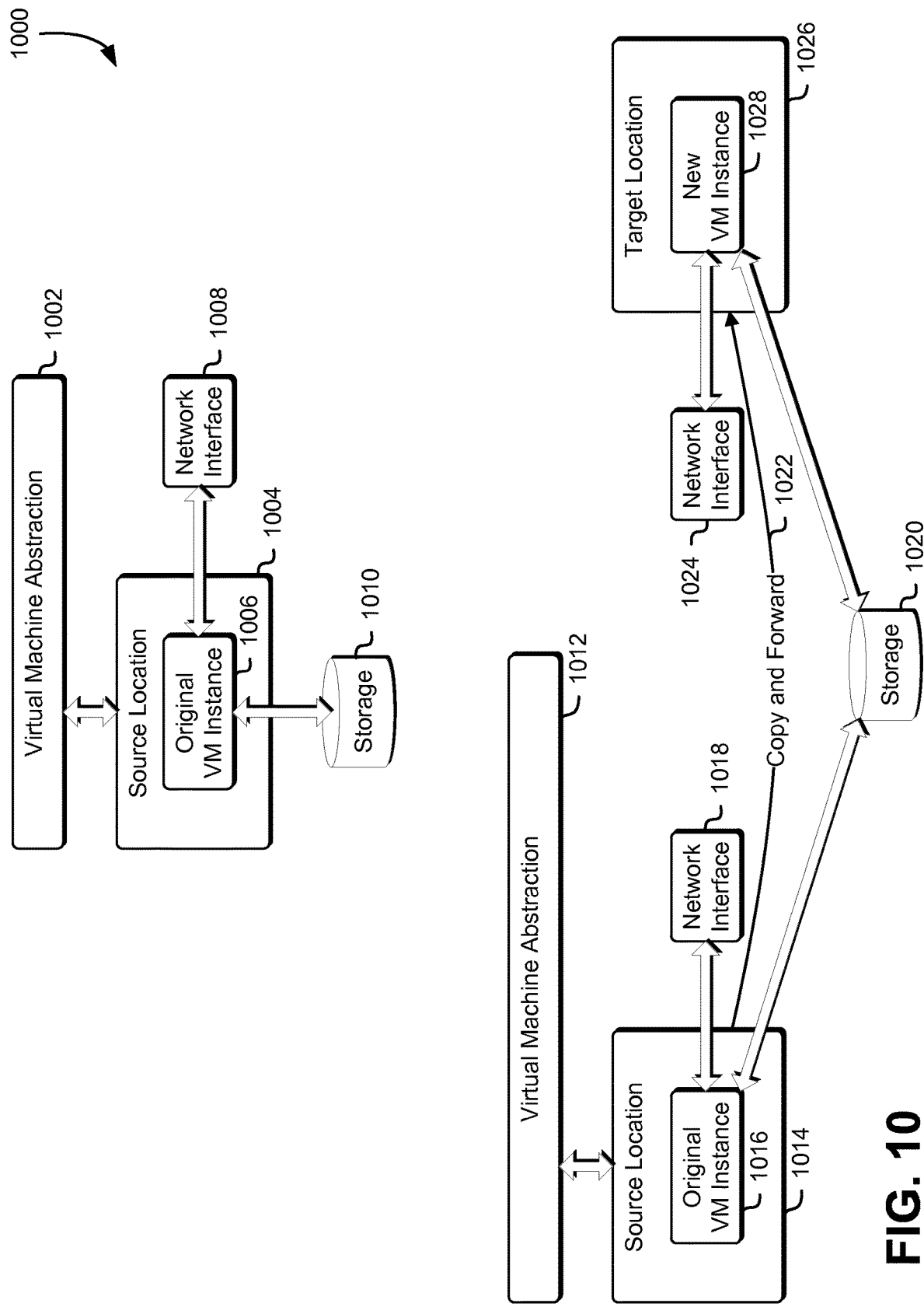
FIG. 10 illustrates an example environment where resources associated with a virtual machine instance migration are managed.

FIG. 10 illustrates an example environment 1000 where resources associated with a virtual machine instance migration are managed as described in FIG. 1 and in accordance with at least one embodiment. The example environment 1000 represents the first part of a migration, such as the migration described herein. A user may have access to a VM abstraction 1002 backed by an original VM instance 1006 at a source location 1004. The original VM instance 1006 may include a network interface 1008 and one or more storage locations 1010. During migration, the user may have the same access to a VM abstraction 1012 backed by the original VM instance 1016 at a source location 1014. The original VM instance 1016 may include a network interface 1018 and one or more storage locations 1020. The network interface 1018 may be shared with a new VM instance 1028 at a target location 1026 and/or may be duplicated as the network interface 1024.

The network interface 1018 and the network interface 1024 may be the same network interface from the perspective of the VM abstraction and/or the user, and the migration manager may manage which is the active interface and which is the standby interface during the course of the migration. For example, prior to the migration, the network interface 1018 may be the active interface and the network interface 1024 may be the standby interface. After the migration, the network interface 1018 may be the standby interface and the network interface 1024 may be the active interface. Additionally, the one or more storage locations 1020 may be shared between the original VM instance 1016 and the new VM instance 1028. During migration, memory and/or state information may be copied and forwarded 1022 from the original VM instance 1016 to the new VM instance 1028 as described herein.

Figure 11:
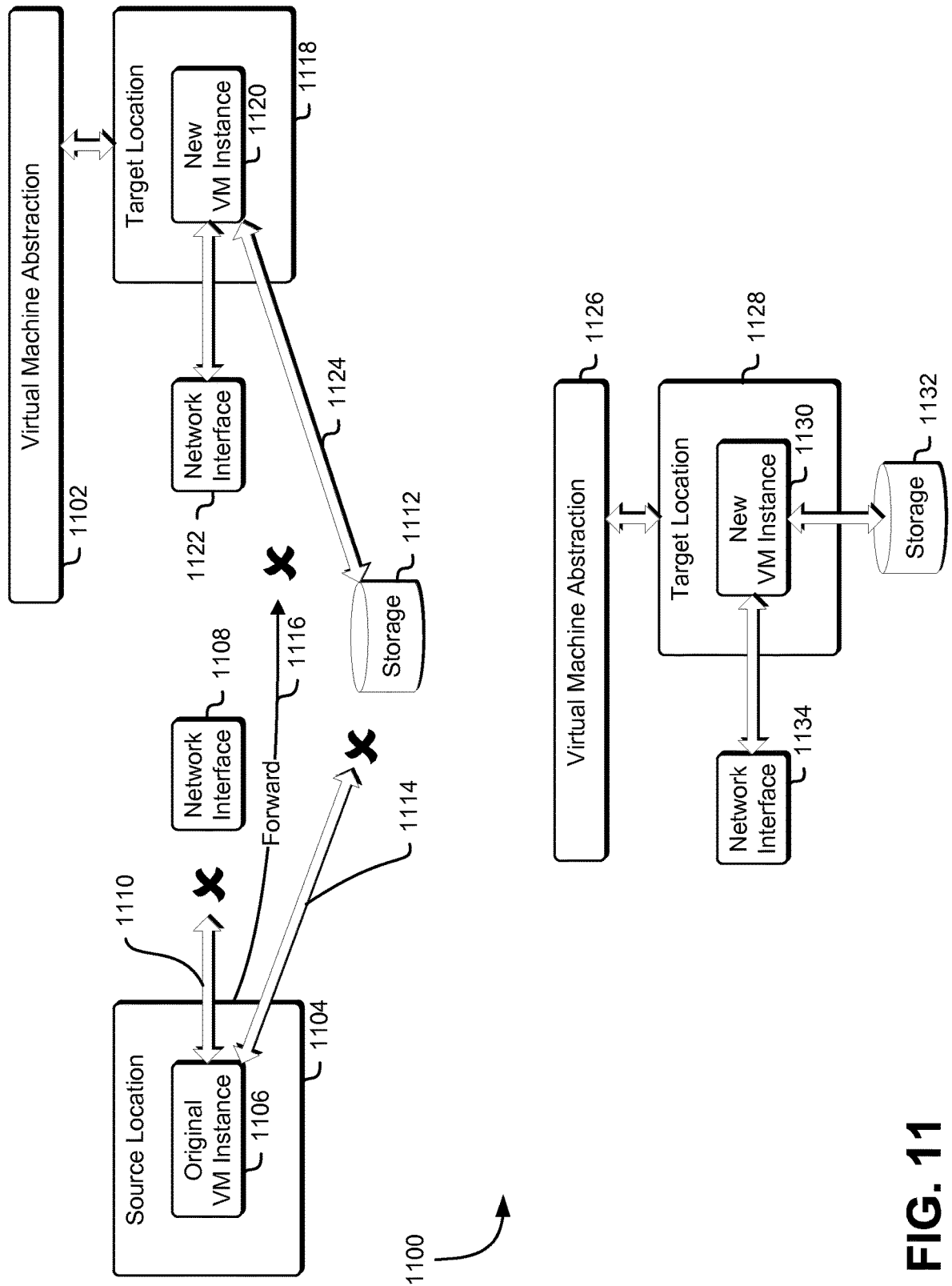
FIG. 11 illustrates an example environment where resources associated with a virtual machine instance migration are managed.

FIG. 11 illustrates an example environment 1100 where resources associated with a virtual machine instance migration are managed as described in FIG. 1 and in accordance with at least one embodiment. The example environment 1100 represents the second part of a migration such as the migrations described herein. A user may have access to a VM abstraction 1102, but because the migration is reaching completion, the VM abstraction 1102 may be backed by a new VM instance 1120 at a target location 1118. Before the end of the migration, the new VM instance 1120 may be resumed so that, for example, the new VM instance 1120 executes instructions, processes input-output operations, and/or generates network traffic.

The new VM instance 1120 may have a network interface 1122 (which may be the same as the network interface 1008 as described above in connection with FIG. 10) and may have access 1124 to one or more storage locations 1112. The network interface 1108 may be the active network interface and the network interface 1122 may be the standby network interface. Meanwhile, the original VM instance 1106 at the source location 1104 may be in the process of being torn down. For example, the connection 1110 to the network interface 1108 may be terminated, the connection 1114 to the one or more storage locations 1112 may be removed, and the packet forwarding 1116 from the original VM instance 1106 to the new VM instance1120 may be stopped after the original VM instance 1106 has converged.

After the successful migration, the user may have access to a VM abstraction 1126 backed by the new VM instance 1130 at the target location 1128. Except for the different location, this new VM instance 1130 should appear to be the same as the original VM instance 1006 described in connection with FIG. 10, with a new active network interface 1134 and access to one or more storage locations 1132.

Figure 12:
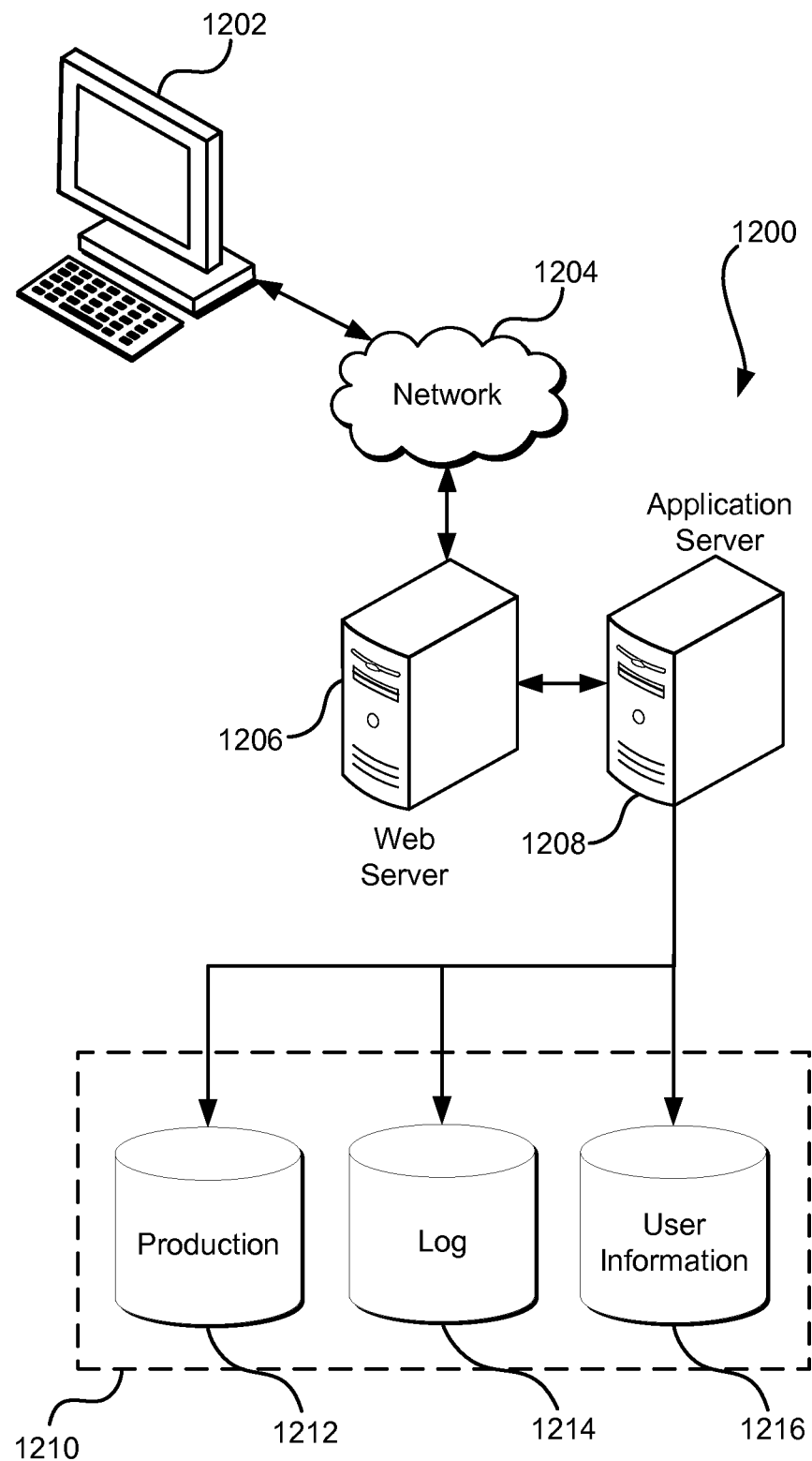
FIG. 12 illustrates an environment in which various embodiments can be implemented.

FIG. 12 illustrates aspects of an example environment 1200 for implementing aspects in accordance with various embodiments. As will be appreciated, although a web-based environment is used for purposes of explanation, different environments may be used, as appropriate, to implement various embodiments. The environment includes an electronic client device 1202, which can include any appropriate device operable to send and/or receive requests, messages, or information over an appropriate network 1204 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 1202 and the application server 1208, can be handled by the web server using PHP: Hypertext Preprocessor ("PHP"), Python, Ruby, Perl, Java, HTML, XML, or another appropriate server-side structured language in this example. Further, operations described herein as being performed by a single device may, unless otherwise clear from context, be performed collectively by multiple devices, which may form a distributed and/or virtual system.

The data store 1210 can include several separate data tables, databases, data documents, dynamic data storage schemes and/or other data storage mechanisms and media for storing data relating to a particular aspect of the present disclosure. For example, the data store illustrated may include mechanisms for storing production data 1212 and user information 1216, which can be used to serve content for the production side. The data store also is shown to include a mechanism for storing log data 1214, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. The application server 1208 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1202. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium, which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. Further, in some examples, computer systems are configured to implement one or more services that collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   calculating a confidence measure that indicates a likelihood of success that a proposed migration of a first virtual machine instance is completable within an amount of time, the confidence measure determined based at least in part on instance data obtained from the first virtual machine instance, where the instance data indicates a predicted load of the first virtual machine instance over an interval of time;
   generating a determination that a policy associated with the first virtual machine allowed the proposed migration;
   based at least in part on the determination, generating a migration event message, the migration event message at least indicating:
      an impact of the proposed migration on the first virtual machine instance determined based at least in part on a history of a set of previously performed maintenance operations, where a subset of the set of previously performed maintenance operations is performed on a second virtual machine instance that is distinct from the first virtual machine instance;
      specifying a time associated with the proposed migration of the first virtual machine instance; and
      the confidence measure for the proposed migration;
   transmitting the migration event message to a network address associated with a customer associated with the first virtual machine instance based at least in part on the policy;
   receiving an application programming interface request, the application programming interface request at least specifying an indication of whether to perform the proposed migration;
   scheduling the proposed migration of the first virtual machine instance at a time based at least in part on the application programming interface request; and performing the proposed migration of the first virtual machine instance based at least in part on the schedule.

2. The computer-implemented method of claim 1, wherein the confidence measure is calculated based at least in part on the predicted load of the first virtual machine instance and a duration of at least one previous migration of the first virtual machine instance indicated in the history of the set of previously performed maintenance operations.

3. The computer-implemented method of claim 1, wherein the confidence measure is further calculated based at least in part on the history of the set of previously performed maintenance operations.

4. The computer-implemented method of claim 1, wherein the history of the set of previously performed maintenance operations includes at least one of: a set of previous migrations of the second virtual machine instance, where the second virtual machine instance has similar characteristics as the first virtual machine instance, a set of previous migrations of the first virtual machine instance, and a set of previous migrations of other virtual machine instances associated with the customer.

5. The computer-implemented method of claim 1, wherein the confidence measure is further calculated based at least in part on a working environment of the first virtual machine instance.

6. A system, comprising:
one or more processors; and
memory storing instructions that, as a result of being executed by one or more processors, cause the system to:
generate a determination that a policy associated with a virtual machine permits performance of a virtual machine maintenance operation on the virtual machine;
transmit a virtual machine instance maintenance event message based at least in part on the determination, the virtual machine instance maintenance event message indicating an impact of performance of the virtual machine maintenance operation on the virtual machine instance determined based at least in part on a history of a set of previously performed maintenance operations, a proposed virtual machine maintenance operation, a proposed time to perform the proposed virtual machine maintenance operation, and a confidence measure associated with the proposed virtual machine maintenance operation determined based at least in part on a load of the virtual machine instance over a previous interval of time;
receive a response to the virtual machine instance maintenance event message, the response at least specifying a time to perform the proposed virtual machine maintenance operation associated with the virtual machine instance maintenance event message; and
cause the proposed virtual machine maintenance operation to be performed based at least in part on the time to perform a virtual machine maintenance operation.

7. The system of claim 6, wherein the response is based at least in part on the first virtual machine instance maintenance event message.

8. The system of claim 6, wherein the proposed virtual machine maintenance operation is a live migration, the live migration configured to at least:
pause the virtual machine instance in a first location;
migrate resources associated with the virtual machine instance from the first location to a second location; and
resume the virtual machine instance at the second location.

9. The system of claim 6, wherein the confidence measure further indicates a probability of success that the proposed virtual machine maintenance operation will be executed within a defined amount of time.

10. The system of claim 9, wherein the confidence measure is calculated based at least in part on instance data obtained from the virtual machine instance, the instance data including an instance type associated with the virtual machine instance and an instance size associated with the virtual machine instance.

11. The system of claim 9, wherein the load is calculated based at least in part on a number of input-output operations over a time interval performed by the virtual machine instance and a number of instructions executed over the time interval by the virtual machine instance.

12. The system of claim 9, wherein the confidence measure is calculated based at least in part on a service level agreement associated with the virtual machine instance, the service level agreement including a maximum downtime for that virtual machine instance.

13. The system of claim 9, wherein the confidence measure is calculated based at least in part on benchmark data obtained from a history data store, the benchmark data based at least in part on one or more maintenance operations associated with a set of virtual machine instances of which the virtual machine instance is a member.

14. A non-transitory computer-readable storage medium storing thereon executable instructions that, as a result of being executed by one or more processors of a computer system, cause the computer system to:
transmit information about an impact of a proposed maintenance operation on a first virtual machine instance, the impact determined based at least in part on a history of a set of previously performed maintenance operations, where the history of the set of previously performed maintenance operations includes a subset of previously performed maintenance operations performed on a second virtual machine instance distinct from the first virtual machine instance, and a proposed maintenance operation associated with the first virtual machine instance, the information including a confidence measure for the proposed maintenance operation that indicates a likelihood of completion of the proposed maintenance operation within a specified amount of time, the confidence measure calculated based at least in part on instance data obtained from the first virtual machine instance and the history of the set of previously performed maintenance operations, where the instance data includes a historical load of the first virtual machine instance over an interval of time;
determine, based at least in part on a response to the information, a time to perform the proposed maintenance operation; and
cause the proposed maintenance operation to be performed at the time.

15. The non-transitory computer-readable storage medium of claim 14, wherein the response is based at least in part on applying a set of virtual machine maintenance policies to the proposed maintenance operation, virtual machine maintenance policies of the set of virtual machine maintenance policies are applied based at least in part on the information.

16. The non-transitory computer-readable storage medium of claim 14, wherein the response is based at least in part on an application programming interface request received from a customer associated with the first virtual machine instance.

17. The non-transitory computer-readable storage medium of claim 14, wherein the instructions that cause the computer system to determine the time to perform the proposed maintenance operation further include instructions that, as a result of being executed by one or more processors, cause the computer system to determine the time based at least in part on a future time when an availability of a resource associated with the proposed maintenance operation is above a minimum value, the minimum value specified within the information.

18. The non-transitory computer-readable storage medium of claim 14, wherein the proposed maintenance operation includes at least one of: a migration of the first virtual machine instance, a reboot of the first virtual machine instance, a reboot of a host computer associated with the first virtual machine instance, and a patch of the first virtual machine instance.

19. The non-transitory computer-readable storage medium of claim 14, wherein the instructions that cause the computer system to transmit the information are executed in response to receiving a request to determine the impact of the proposed maintenance operation, the request specifying the proposed maintenance operation and a time interval in which to perform the proposed maintenance operation, the time interval at least including a start time and an end time.

20. The non-transitory computer-readable storage medium of claim 14, wherein the response is based at least in part on a precursor condition associated with the proposed maintenance operation, the precursor condition specifying an event associated with the proposed maintenance operation that must occur prior to performing the proposed maintenance operation.

21. The non-transitory computer-readable storage medium of claim 14, wherein the second virtual machine instance shares a set of capabilities with the first virtual machine instance.

* * * * *